United States Patent
Jordan, II et al.

(10) Patent No.: US 10,943,447 B1
(45) Date of Patent: *Mar. 9, 2021

(54) SYSTEMS AND METHODS FOR AUTOMATICALLY RESPONDING TO A FIRE

(71) Applicant: STATE FARM MUTUAL AUTOMOBILE INSURANCE COMPANY, Bloomington, IL (US)

(72) Inventors: Jackie O. Jordan, II, Bloomington, IL (US); John Donovan, Bloomington, IL (US); David Turrentine, Normal, IL (US); Torri Wollenschlager, Bloomington, IL (US); Bryan R. Nussbaum, Bloomington, IL (US); Deanna Stockweather, Normal, IL (US); Jeffrey W. Stoiber, Atlanta, GA (US); Kerstin Markwardt, Phoenix, AZ (US); Gail L. Carlson, Bloomington, IL (US); Kyle C. Schiebel, Bloomington, IL (US); Troy Winslow, Bloomington, IL (US); Joseph P. Harr, Bloomington, IL (US); Ellakate Wagner, Bloomington, IL (US); Michael Harris, Jr., Tempe, AZ (US); Jennylind Sun, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/692,536

(22) Filed: Nov. 22, 2019

Related U.S. Application Data

(63) Continuation of application No. 16/266,423, filed on Feb. 4, 2019, now Pat. No. 10,522,009, which is a
(Continued)

(51) Int. Cl.
*G06Q 40/00* (2012.01)
*G08B 7/06* (2006.01)
(Continued)

(52) U.S. Cl.
CPC ............. *G08B 7/066* (2013.01); *G06Q 40/08* (2013.01); *G08B 7/062* (2013.01); *G08B 17/10* (2013.01); *H04L 67/12* (2013.01)

(58) Field of Classification Search
CPC ........ G08B 7/066; G08B 7/062; G08B 17/10; G06Q 40/08; H04L 67/12
(Continued)

(56) References Cited

U.S. PATENT DOCUMENTS 3,648,326 A * 3/1972 Gaysowski ............. E05F 3/222
16/48.5
3,740,739 A 6/1973 Griffin, III et al.
(Continued)

FOREIGN PATENT DOCUMENTS

| CN | 202865924 U | 4/2013 |
| WO | WO-2013/076721 A1 | 5/2013 |
| WO | WO-2014/207558 A2 | 12/2014 |

OTHER PUBLICATIONS

Knutsen, Confusion about causation in insurance: solutions for catastrophic losses, Ala. L. Rev., 5:957-1023 (2010).
System for Loss Prevention, IP.com, published Nov. 8, 2008.

*Primary Examiner* — Zhen Y Wu
(74) *Attorney, Agent, or Firm* — Marshall, Gerstein & Borun LLP

(57) ABSTRACT

Methods and systems for generating a response to detecting a fire on a property are provided. In certain aspects, a smart home controller (or other smart controller) may analyze data received from smart devices disposed on, within, or proximate to a property. If it is determined that a fire is present on the premises of the property, the smart home controller may
(Continued)

determine a location of the fire as compared to the smart devices. The smart home controller may then generate and transmit instructions causing a portion of the smart devices to perform a set of actions to mitigate risks associated with the presence of the fire on the property. The smart home controller may also compare the location of the fire with a location of an occupant, and generate an escape route for the occupant. Insurance policies, premiums, or discounts may be adjusted based upon the fire response/mitigation functionality.

17 Claims, 5 Drawing Sheets

Related U.S. Application Data continuation of application No. 14/873,942, filed on Oct. 2, 2015, now Pat. No. 10,249,158.

(60) Provisional application No. 62/220,383, filed on Sep. 18, 2015, provisional application No. 62/201,671, filed on Aug. 6, 2015, provisional application No. 62/200,375, filed on Aug. 3, 2015, provisional application No. 62/198,813, filed on Jul. 30, 2015, provisional application No. 62/197,343, filed on Jul. 27, 2015, provisional application No. 62/193,317, filed on Jul. 16, 2015, provisional application No. 62/189,329, filed on Jul. 7, 2015, provisional application No. 62/187,651, filed on Jul. 1, 2015, provisional application No. 62/187,624, filed on Jul. 1, 2015, provisional application No. 62/187,642, filed on Jul. 1, 2015, provisional application No. 62/187,666, filed on Jul. 1, 2015, provisional application No. 62/187,645, filed on Jul. 1, 2015, provisional application No. 62/105,407, filed on Jan. 20, 2015, provisional application No. 62/060,962, filed on Oct. 7, 2014.

(51) Int. Cl.
*G06Q 40/08* (2012.01)
*H04L 29/08* (2006.01)
*G08B 17/10* (2006.01)

(58) Field of Classification Search
USPC .................................................. 340/4; 705/4
See application file for complete search history.

(56) References Cited

U.S. PATENT DOCUMENTS

| | | | | |
|---|---|---|---|---|
| 3,771,823 A * | 11/1973 | Schnarr | ................... | E05F 3/222 292/270 |
| 3,817,161 A * | 6/1974 | Koplon | ................... | A62C 3/04 454/342 |
| 3,875,612 A * | 4/1975 | Poitras | ................... | A62C 2/12 16/48.5 |
| 3,934,306 A * | 1/1976 | Farris | ................... | E05F 3/223 16/48.5 |
| 4,066,072 A | 1/1978 | Cummins | | |
| 4,418,712 A | 12/1983 | Braley | | |
| 4,688,026 A | 8/1987 | Scribner et al. | | |
| 5,005,125 A | 4/1991 | Farrar et al. | | |
| 5,038,268 A | 8/1991 | Krause et al. | | |
| 5,099,751 A * | 3/1992 | Newman | ................... | A62B 3/00 454/187 |
| 5,128,859 A | 7/1992 | Carbone et al. | | |
| 5,267,587 A | 12/1993 | Brown | | |
| 5,554,433 A * | 9/1996 | Perrone, Jr. | ............. | A62C 2/065 428/192 |
| 5,576,952 A | 11/1996 | Stutman et al. | | |
| 5,684,710 A | 11/1997 | Ehlers et al. | | |
| 5,903,426 A | 5/1999 | Ehling | | |
| 5,979,607 A * | 11/1999 | Allen | ....................... | B66B 5/024 187/390 |
| 6,023,762 A | 2/2000 | Dean et al. | | |
| 6,084,367 A | 7/2000 | Landert | | |
| 6,155,324 A * | 12/2000 | Elliott | ....................... | A62C 2/18 160/1 |
| 6,222,455 B1 * | 4/2001 | Kaiser | .................... | G08B 5/002 340/577 |
| 6,237,618 B1 | 5/2001 | Kushner | | |
| 6,286,682 B1 | 9/2001 | d'Arbelles | | |
| 6,317,047 B1 * | 11/2001 | Stein | ....................... | A62B 99/00 340/298 |
| 6,526,807 B1 | 3/2003 | Doumit et al. | | |
| 6,553,336 B1 | 4/2003 | Johnson et al. | | |
| 6,812,848 B2 | 11/2004 | Candela | | |
| 6,934,692 B1 | 8/2005 | Duncan | | |
| 6,977,585 B2 | 12/2005 | Falk et al. | | |
| 6,998,960 B2 * | 2/2006 | Buschmann | ........... | G08B 7/062 340/286.05 |
| 7,030,767 B2 | 4/2006 | Candela | | |
| 7,161,483 B2 | 1/2007 | Chung | | |
| 7,194,416 B1 | 3/2007 | Provost et al. | | |
| 7,259,656 B1 | 8/2007 | Wright | | |
| 7,309,216 B1 | 12/2007 | Spadola, Jr. et al. | | |
| 7,348,882 B2 | 3/2008 | Adamczyk et al. | | |
| 7,356,516 B2 | 4/2008 | Richey et al. | | |
| 7,395,219 B2 | 7/2008 | Strech | | |
| 7,598,856 B1 * | 10/2009 | Nick | ..................... | G01S 1/7034 340/539.13 |
| 7,657,441 B2 | 2/2010 | Richey et al. | | |
| 7,683,793 B2 * | 3/2010 | Li | ......................... | G08B 7/062 340/628 |
| 7,715,036 B2 | 5/2010 | Silverbrook et al. | | |
| 7,809,587 B2 | 10/2010 | Dorai et al. | | |
| 7,813,822 B1 | 10/2010 | Hoffberg | | |
| 7,882,514 B2 | 2/2011 | Nielsen et al. | | |
| 8,010,992 B1 | 8/2011 | Chang et al. | | |
| 8,031,079 B2 | 10/2011 | Kates | | |
| 8,041,636 B1 | 10/2011 | Hunter et al. | | |
| 8,106,769 B1 | 1/2012 | Maroney et al. | | |
| 8,108,271 B1 | 1/2012 | Duncan et al. | | |
| 8,219,558 B1 | 7/2012 | Trandal et al. | | |
| 8,229,861 B1 | 7/2012 | Trandal et al. | | |
| 8,280,633 B1 | 10/2012 | Eldering et al. | | |
| 8,289,160 B1 | 10/2012 | Billman | | |
| 8,316,237 B1 | 11/2012 | Felsher et al. | | |
| 8,400,299 B1 | 3/2013 | Maroney et al. | | |
| 8,510,196 B1 | 8/2013 | Brandmaier et al. | | |
| 8,527,306 B1 | 9/2013 | Reeser et al. | | |
| 8,533,144 B1 | 9/2013 | Reeser et al. | | |
| 8,595,034 B2 | 11/2013 | Bauer et al. | | |
| 8,595,790 B2 | 11/2013 | Chang et al. | | |
| 8,596,293 B2 | 12/2013 | Mous et al. | | |
| 8,605,209 B2 | 12/2013 | Becker | | |
| 8,620,841 B1 | 12/2013 | Filson et al. | | |
| 8,621,097 B2 | 12/2013 | Venkatakrishnan et al. | | |
| 8,650,048 B1 | 2/2014 | Hopkins, III et al. | | |
| 8,694,501 B1 | 4/2014 | Trandal et al. | | |
| 8,712,893 B1 | 4/2014 | Brandmaier et al. | | |
| 8,719,134 B1 | 5/2014 | Huls et al. | | |
| 8,730,039 B1 | 5/2014 | Billman | | |
| 8,731,975 B2 | 5/2014 | English et al. | | |
| 8,749,381 B1 | 6/2014 | Maroney et al. | | |
| 8,786,425 B1 | 7/2014 | Hutz | | |
| 8,798,289 B1 | 8/2014 | Every et al. | | |
| 9,009,783 B2 | 4/2015 | Bartholomay et al. | | |
| 9,049,168 B2 | 6/2015 | Jacob et al. | | |
| 9,257,023 B2 * | 2/2016 | Lee | ....................... | G08B 7/066 |
| 9,280,252 B1 | 3/2016 | Brandmaier et al. | | |
| 9,297,150 B2 | 3/2016 | Klicpera | | |
| 9,368,009 B2 | 6/2016 | Lee et al. | | |
| 9,424,606 B2 | 8/2016 | Wilson, II et al. | | |
| 9,429,925 B2 | 8/2016 | Wait | | |
| 9,516,141 B2 * | 12/2016 | Dubois | .................. | G16H 40/63 |
| 9,652,976 B2 | 5/2017 | Bruck et al. | | |
| 9,654,434 B2 | 5/2017 | Sone et al. | | |

(56) References Cited

U.S. PATENT DOCUMENTS

| | | |
|---|---|---|
| 9,665,892 B1 | 5/2017 | Reeser et al. |
| 9,666,060 B2 | 5/2017 | Reeser et al. |
| 9,685,053 B2 | 6/2017 | Palmeri |
| 9,710,858 B1 | 7/2017 | Devereaux et al. |
| 9,721,399 B2 | 8/2017 | Ishikawa |
| 9,727,921 B2 | 8/2017 | Cook et al. |
| 9,824,397 B1 | 11/2017 | Patel et al. |
| 9,882,985 B1 | 1/2018 | Esam et al. |
| 9,892,463 B1 | 2/2018 | Hakimi-Boushehri et al. |
| 9,898,912 B1 | 2/2018 | Jordan, II et al. |
| 9,947,051 B1 | 4/2018 | Allen et al. |
| 9,947,202 B1 | 4/2018 | Moon et al. |
| 10,005,793 B2 | 6/2018 | Mazitschek et al. |
| 10,042,341 B1 | 8/2018 | Jacob |
| 10,055,793 B1 | 8/2018 | Call et al. |
| 10,102,585 B1 | 10/2018 | Bryant et al. |
| 10,169,771 B1 | 1/2019 | Devereaux et al. |
| 10,181,160 B1 | 1/2019 | Hakimi-Boushehri et al. |
| 10,249,158 B1 | 4/2019 | Jordan, II et al. |
| 10,282,787 B1 | 5/2019 | Hakimi-Boushehri et al. |
| 10,282,788 B1 | 5/2019 | Jordan, II et al. |
| 10,346,811 B1 | 7/2019 | Jordan, II et al. |
| 10,353,359 B1 | 7/2019 | Jordan, II et al. |
| 10,356,303 B1 | 7/2019 | Jordan, II et al. |
| 10,388,135 B1 | 8/2019 | Jordan, II et al. |
| 10,514,669 B1 | 12/2019 | Call et al. |
| 10,522,009 B1 | 12/2019 | Jordan, II et al. |
| 10,552,911 B1 | 2/2020 | Allen et al. |
| 10,607,295 B1 | 3/2020 | Hakimi-Boushehri et al. |
| 10,679,292 B1 | 6/2020 | Call et al. |
| 10,685,402 B1 | 6/2020 | Bryant et al. |
| 10,741,033 B1 | 8/2020 | Jordan et al. |
| 2001/0025349 A1 | 9/2001 | Sharood et al. |
| 2002/0040306 A1 | 4/2002 | Sugiyama et al. |
| 2002/0147006 A1 | 10/2002 | Coon et al. |
| 2002/0184643 A1* | 12/2002 | Fichet .......... H04N 17/00 725/105 |
| 2003/0025599 A1 | 2/2003 | Monroe |
| 2003/0048191 A1 | 3/2003 | Denton |
| 2003/0192600 A1 | 10/2003 | Ford |
| 2003/0234725 A1 | 12/2003 | Lemelson et al. |
| 2004/0054789 A1 | 3/2004 | Breh et al. |
| 2004/0153346 A1 | 8/2004 | Grundel et al. |
| 2004/0153382 A1 | 8/2004 | Boccuzzi et al. |
| 2004/0177032 A1 | 9/2004 | Bradley et al. |
| 2004/0185844 A1 | 9/2004 | Neuman |
| 2004/0211228 A1 | 10/2004 | Nishio et al. |
| 2004/0214566 A1 | 10/2004 | Suzuki et al. |
| 2005/0030175 A1 | 2/2005 | Wolfe |
| 2005/0080520 A1 | 4/2005 | Kline et al. |
| 2005/0111696 A1 | 5/2005 | Baer |
| 2005/0139420 A1* | 6/2005 | Spoltore .......... E06C 9/14 182/49 |
| 2005/0143956 A1 | 6/2005 | Long et al. |
| 2005/0241003 A1* | 10/2005 | Sweeney .......... H04W 4/029 726/28 |
| 2005/0251427 A1 | 11/2005 | Dorai et al. |
| 2005/0275527 A1 | 12/2005 | Kates |
| 2006/0033625 A1 | 2/2006 | Johnson et al. |
| 2006/0058612 A1 | 3/2006 | Dave et al. |
| 2006/0100912 A1 | 5/2006 | Kumar et al. |
| 2006/0154642 A1 | 7/2006 | Scannell |
| 2006/0158339 A1 | 7/2006 | Brundula |
| 2006/0184379 A1 | 8/2006 | Tan et al. |
| 2007/0001904 A1 | 1/2007 | Mendelson |
| 2007/0096938 A1 | 5/2007 | Lopez et al. |
| 2007/0262857 A1 | 11/2007 | Jackson |
| 2007/0276626 A1 | 11/2007 | Bruffey |
| 2007/0289635 A1 | 12/2007 | Ghazarian et al. |
| 2008/0018474 A1* | 1/2008 | Bergman .......... G08B 13/2471 340/572.7 |
| 2008/0019392 A1 | 1/2008 | Lee |
| 2008/0056722 A1 | 3/2008 | Hendrix et al. |
| 2008/0059351 A1 | 3/2008 | Richey et al. |
| 2008/0065427 A1 | 3/2008 | Helitzer et al. |
| 2008/0101160 A1 | 5/2008 | Besson |
| 2008/0184272 A1 | 7/2008 | Brownewell |
| 2008/0285797 A1* | 11/2008 | Hammadou .......... G06K 9/00771 382/103 |
| 2008/0301216 A1* | 12/2008 | Han .......... H04L 12/2838 709/202 |
| 2009/0001891 A1* | 1/2009 | Patterson .......... G08B 7/066 315/129 |
| 2009/0024420 A1 | 1/2009 | Winkler |
| 2009/0044595 A1 | 2/2009 | Vokey |
| 2009/0094129 A1 | 4/2009 | Rhodes et al. |
| 2009/0174364 A1 | 7/2009 | Onishi et al. |
| 2009/0195349 A1 | 8/2009 | Frader-Thompson et al. |
| 2009/0243852 A1 | 10/2009 | Haupt et al. |
| 2009/0259581 A1 | 10/2009 | Horowitz et al. |
| 2009/0265193 A1 | 10/2009 | Collins et al. |
| 2010/0025349 A1 | 2/2010 | Khoshnevis |
| 2010/0073840 A1* | 3/2010 | Hennessey, Jr. .......... H02H 5/00 361/114 |
| 2010/0131416 A1 | 5/2010 | Means |
| 2010/0188023 A1* | 7/2010 | Anderson .......... F21S 8/033 315/312 |
| 2010/0188206 A1 | 7/2010 | Kates |
| 2010/0235285 A1 | 9/2010 | Hoffberg |
| 2010/0241465 A1 | 9/2010 | Amigo et al. |
| 2010/0289643 A1 | 11/2010 | Trundle et al. |
| 2010/0299217 A1 | 11/2010 | Hui |
| 2011/0003577 A1 | 1/2011 | Rogalski et al. |
| 2011/0029145 A1 | 2/2011 | Dong |
| 2011/0040785 A1 | 2/2011 | Steenberg et al. |
| 2011/0077875 A1 | 3/2011 | Tran et al. |
| 2011/0112660 A1* | 5/2011 | Bergmann .......... G08B 17/00 700/29 |
| 2011/0136463 A1 | 6/2011 | Ebdon et al. |
| 2011/0161117 A1 | 6/2011 | Busque et al. |
| 2011/0161119 A1* | 6/2011 | Collins .......... G06Q 40/08 705/4 |
| 2011/0166714 A1 | 7/2011 | Stachnik |
| 2011/0195687 A1 | 8/2011 | Das et al. |
| 2011/0203383 A1 | 8/2011 | Phelps |
| 2011/0251807 A1 | 10/2011 | Rada et al. |
| 2011/0270453 A1 | 11/2011 | Kalogridis et al. |
| 2012/0016695 A1 | 1/2012 | Bernard et al. |
| 2012/0046973 A1 | 2/2012 | Eshleman et al. |
| 2012/0079092 A1 | 3/2012 | Woxblom et al. |
| 2012/0101855 A1 | 4/2012 | Collins et al. |
| 2012/0116071 A1 | 5/2012 | Rao et al. |
| 2012/0116820 A1 | 5/2012 | English et al. |
| 2012/0166115 A1 | 6/2012 | Apostolakis |
| 2012/0188081 A1 | 7/2012 | Van Katwijk |
| 2012/0191498 A1 | 7/2012 | Singh et al. |
| 2012/0232935 A1 | 9/2012 | Voccola |
| 2012/0249121 A1* | 10/2012 | Pamulaparthy .......... H02J 3/26 324/86 |
| 2012/0265586 A1 | 10/2012 | Mammone |
| 2012/0290333 A1 | 11/2012 | Birchall |
| 2012/0290497 A1 | 11/2012 | Magara et al. |
| 2012/0296580 A1 | 11/2012 | Barkay |
| 2012/0311620 A1 | 12/2012 | Conklin et al. |
| 2013/0049950 A1 | 2/2013 | Wohlert |
| 2013/0073321 A1 | 3/2013 | Hofmann et al. |
| 2013/0085688 A1 | 4/2013 | Miller et al. |
| 2013/0096960 A1 | 4/2013 | English et al. |
| 2013/0107706 A1 | 5/2013 | Raleigh |
| 2013/0120137 A1 | 5/2013 | Lehmann |
| 2013/0144486 A1 | 6/2013 | Ricci |
| 2013/0145693 A1 | 6/2013 | Li |
| 2013/0159021 A1 | 6/2013 | Felsher |
| 2013/0166325 A1 | 6/2013 | Ganapathy et al. |
| 2013/0169817 A1 | 7/2013 | Jones et al. |
| 2013/0226624 A1 | 8/2013 | Blessman et al. |
| 2013/0234840 A1 | 9/2013 | Trundle et al. |
| 2013/0257626 A1 | 10/2013 | Masli et al. |
| 2013/0263611 A1 | 10/2013 | Kearney et al. |
| 2013/0290013 A1 | 10/2013 | Forrester |
| 2013/0290033 A1 | 10/2013 | Reeser et al. |
| 2014/0032433 A1 | 1/2014 | Eick et al. |
| 2014/0122133 A1 | 5/2014 | Weisberg et al. |

(56) References Cited

U.S. PATENT DOCUMENTS

| | | |
|---|---|---|
| 2014/0136242 A1 | 5/2014 | Weekes et al. |
| 2014/0149127 A1* | 5/2014 | Storti ................... H04H 60/58 |
| | | 704/500 |
| 2014/0180723 A1 | 6/2014 | Cote et al. |
| 2014/0201315 A1 | 7/2014 | Jacob et al. |
| 2014/0201844 A1 | 7/2014 | Buck |
| 2014/0216071 A1 | 8/2014 | Broadbent |
| 2014/0222329 A1* | 8/2014 | Frey ..................... G01C 21/206 |
| | | 701/423 |
| 2014/0222469 A1 | 8/2014 | Stahl et al. |
| 2014/0229205 A1 | 8/2014 | Gibson |
| 2014/0238511 A1 | 8/2014 | Klicpera |
| 2014/0244997 A1 | 8/2014 | Goel et al. |
| 2014/0257862 A1 | 9/2014 | Billman et al. |
| 2014/0257871 A1 | 9/2014 | Christensen et al. |
| 2014/0257876 A1 | 9/2014 | English et al. |
| 2014/0266717 A1 | 9/2014 | Warren et al. |
| 2014/0278571 A1 | 9/2014 | Mullen et al. |
| 2014/0303801 A1 | 10/2014 | Ahn et al. |
| 2014/0310162 A1* | 10/2014 | Collins ............... G06F 3/04842 |
| | | 705/39 |
| 2014/0313044 A1 | 10/2014 | Thompson et al. |
| 2014/0317741 A1* | 10/2014 | Be'ery ..................... H04L 63/30 |
| | | 726/23 |
| 2014/0318200 A1* | 10/2014 | Ellis ........................ A62C 2/242 |
| | | 70/465 |
| 2014/0320295 A1* | 10/2014 | Kates ..................... G08B 25/10 |
| | | 340/628 |
| 2014/0340216 A1 | 11/2014 | Puskarich |
| 2014/0340222 A1* | 11/2014 | Thornton ............... G08B 7/062 |
| | | 340/539.17 |
| 2014/0358592 A1* | 12/2014 | Wedig ................... G06Q 40/08 |
| | | 705/4 |
| 2014/0379156 A1 | 12/2014 | Kamel et al. |
| 2015/0020299 A1 | 1/2015 | Hsu |
| 2015/0032480 A1 | 1/2015 | Blackhurst et al. |
| 2015/0061859 A1 | 3/2015 | Matsuoka et al. |
| 2015/0116107 A1 | 4/2015 | Fadell et al. |
| 2015/0116112 A1 | 4/2015 | Flinsenberg et al. |
| 2015/0124087 A1 | 5/2015 | Jones, Jr. et al. |
| 2015/0135596 A1* | 5/2015 | Cooper ................... E05D 15/22 |
| | | 49/420 |
| 2015/0154712 A1 | 6/2015 | Cook |
| 2015/0160623 A1 | 6/2015 | Holley |
| 2015/0160636 A1* | 6/2015 | McCarthy, III .. H04N 21/43615 |
| | | 348/552 |
| 2015/0163412 A1* | 6/2015 | Holley ................ H04L 12/2803 |
| | | 348/143 |
| 2015/0168976 A1 | 6/2015 | Loucks et al. |
| 2015/0170288 A1 | 6/2015 | Harton et al. |
| 2015/0206249 A1 | 7/2015 | Fini |
| 2015/0254940 A1 | 9/2015 | Graef et al. |
| 2015/0287310 A1 | 10/2015 | Deliuliis et al. |
| 2015/0305690 A1 | 10/2015 | Tan et al. |
| 2015/0332407 A1 | 11/2015 | Wilson, II et al. |
| 2015/0364028 A1 | 12/2015 | Child et al. |
| 2016/0005130 A1 | 1/2016 | Devereaux et al. |
| 2016/0006723 A1 | 1/2016 | Wilson |
| 2016/0018226 A1* | 1/2016 | Plocher ..................... A62B 3/00 |
| | | 701/428 |
| 2016/0042463 A1 | 2/2016 | Gillespie |
| 2016/0078744 A1 | 3/2016 | Gieck |
| 2016/0104250 A1 | 4/2016 | Allen et al. |
| 2016/0119424 A1 | 4/2016 | Kane et al. |
| 2016/0161940 A1 | 6/2016 | Max |
| 2016/0188829 A1 | 6/2016 | Southerland et al. |
| 2016/0269882 A1 | 9/2016 | Balthasar et al. |
| 2016/0269883 A1 | 9/2016 | Eswaran |
| 2016/0323771 A1 | 11/2016 | Raleigh |
| 2016/0337829 A1 | 11/2016 | Fletcher et al. |
| 2016/0343084 A1 | 11/2016 | Blessman et al. |
| 2017/0116676 A1 | 4/2017 | Blessman et al. |
| 2017/0147722 A1 | 5/2017 | Greenwood |
| 2017/0304659 A1* | 10/2017 | Chen ........................ A62B 3/00 |
| 2018/0000346 A1 | 1/2018 | Cronin |
| 2018/0160988 A1 | 6/2018 | Miller et al. |

\* cited by examiner

SYSTEMS AND METHODS FOR AUTOMATICALLY RESPONDING TO A FIRE

CROSS-REFERENCE TO RELATED APPLICATIONS

This application is a continuation of, and claims the benefit of, U.S. patent application Ser. No. 16/266,423 filed Feb. 4, 2019, which is a continuation of, and claims the benefit of, U.S. patent application Ser. No. 14/873,942 filed Oct. 2, 2015, which claims benefit of the filing date of U.S. Provisional Patent Application No. 62/060,962 (filed Oct. 7, 2014, and entitled "SYSTEMS AND METHODS FOR MANAGING DEVICES WITHIN A CONNECTED PROPERTY AND INSURANCE POLICIES ASSOCIATED THEREWITH"); 62/105,407 (filed Jan. 20, 2015, and entitled "SYSTEMS AND METHODS FOR MANAGING DEVICES WITHIN A CONNECTED PROPERTY AND INSURANCE POLICIES ASSOCIATED THEREWITH"); 62/187,624 (filed Jul. 1, 2015, and entitled "SYSTEMS AND METHODS FOR FACILITATING DEVICE REPLACEMENT WITHIN A CONNECTED PROPERTY"); 62/187,645 (filed Jul. 1, 2015, and entitled "SYSTEMS AND METHODS FOR MANAGING BUILDING CODE COMPLIANCE FOR A PROPERTY"); 62/187,651 (filed Jul. 1, 2015, and entitled "SYSTEMS AND METHODS FOR AUTOMATICALLY GENERATING AN ESCAPE ROUTE"); 62/187,642 (filed Jul. 1, 2015, and entitled "SYSTEMS AND METHODS FOR ANALYZING SENSOR DATA TO DETECT PROPERTY INTRUSION EVENTS"); 62/187,666 (filed Jul. 1, 2015, and entitled "SYSTEMS AND METHODS FOR IMPROVED ASSISTED OR INDEPENDENT LIVING ENVIRONMENTS"); 62/189,329 (filed Jul. 7, 2015, and entitled "SYSTEMS AND METHODS FOR MANAGING WARRANTY INFORMATION ASSOCIATED WITH DEVICES POPULATED WITHIN A PROPERTY"); 62/193,317 (filed Jul. 16, 2015, and entitled "SYSTEMS AND METHODS FOR MANAGING SMART DEVICES BASED UPON ELECTRICAL USAGE DATA"); 62/197,343 (filed Jul. 27, 2015, and entitled "SYSTEMS AND METHODS FOR CONTROLLING SMART DEVICES BASED UPON IMAGE DATA FROM IMAGE SENSORS"); 62/198,813 (filed Jul. 30, 2015, and entitled "SYSTEMS AND METHODS FOR MANAGING SERVICE LOG INFORMATION"); 62/200,375 (filed Aug. 3, 2015, and entitled "SYSTEMS AND METHODS FOR AUTOMATICALLY RESPONDING TO A FIRE"); 62/201,671 (filed Aug. 6, 2015, and entitled "SYSTEMS AND METHODS FOR AUTOMATICALLY MITIGATING RISK OF DAMAGE FROM BROKEN CIRCUITS"); 62/220,383 (filed Sep. 18, 2015, and entitled "METHODS AND SYSTEMS FOR RESPONDING TO A BROKEN CIRCUIT")—which are all hereby incorporated by reference in their entireties.

FIELD OF THE DISCLOSURE

The present disclosure generally relates to automatically responding to the presence of a fire, and, more particularly, to systems and methods that leverage a plurality of smart appliances or devices to mitigate risks associated with the fire.

BACKGROUND

There are many emergency situations that may impact buildings and the people located within the buildings. In some such emergency situations, a building may be on fire and/or a fire may be present inside a building. Currently, many appliances and other goods are capable of communicating information about their operation via mesh networks as part of the "internet of things." However, there is no way to aggregate and analyze all of this communicated data to detect the presence of the fire. Further, there is no way to analyze the data to determine the most appropriate response to mitigate the risks associated with the fire.

SUMMARY

The present embodiments may, inter alia, detect the presence of a fire and determine a response that mitigates the risks associated with the presence of the fire. For instance, a system and method may facilitate communications with connected devices and items, and/or facilitate the evacuation of individuals located on a property (e.g., smart home) and/or alter a navigation state associated with a door. The present embodiments may monitor sensor data received from a plurality of devices populated on the premises of the property. Each of the plurality of devices may be configured to monitor various conditions of the property to determine the presence of a fire on the premises of the property. A controller may determine the location of the fire to determine which of the devices should perform an action that mitigates the risks associated with the presence of the fire. The controller may also determine a set of actions that may be performed by the plurality of devices that mitigates the risks. Additionally, the controller may transmit escape routes to individuals to ensure effective and efficient evacuation procedures while minimizing the risk of harm to the individuals.

In one aspect, a computer-implemented method of responding to a fire on a property may be provided. The property may be populated with a hardware controller in communication with a plurality of devices and each of the plurality of devices may be configured to monitor various conditions associated with the property. The method may include, with customer permission or affirmative consent, (1) receiving, by the hardware controller via a first communication network, a first set of sensor data from at least one of the plurality of devices, the first set of sensor data indicative of the fire being present on the property; (2) analyzing, by one or more processors, the first set of sensor data to determine a location of the fire on the property; (3) comparing, by the one or more processors, the location of the fire to a list of the plurality of devices, the list including for each device at least one of a location of the device and/or a set of functions that the device is capable of performing to mitigate risks associated with the fire; (4) based upon the comparison, determining, by the one or more processors, a set of actions to be performed by at least a portion of the plurality of devices; and/or (5) directing or controlling, by the one or more processors, the at least the portion of the plurality of devices to perform the set of actions to facilitate a set of individuals escaping the fire in a safe manner. The method may include additional, less, or alternate actions, including those discussed elsewhere herein.

In another aspect, a system for responding to a fire on a property may be provided. The property populated with a hardware controller in communication with a plurality of devices and each of the plurality of devices may be configured to monitor various conditions associated with the property. The system may include (i) a plurality of transceivers adapted to communicate data; (ii) a memory adapted to store non-transitory computer executable instructions;

and/or (iii) one or more processors adapted to interface with the plurality of transceivers. The one or more processors may be configured to execute the non-transitory computer executable instructions to cause the system to, with customer permission, (1) receive, by the plurality of transceivers, a first set of sensor data from at least one of the plurality of devices, the first set of sensor data indicative of the fire being present on the property; (2) analyze, by the one or more processors, the first set of sensor data to determine a location of the fire on the property; (3) compare, by the one or more processors, the location of the fire to a list of the plurality of devices, the list including for each device at least one of a location of the device and/or a set of functions that the device is capable of performing to mitigate risks associated with the fire; (4) based upon the comparison, determine, by the one or more processors, a set of actions to be performed by at least a portion of the plurality of devices; and/or (5) direct or control, by the one or more processors, the at least the portion of the plurality of devices to perform the set of actions to facilitate a set of individuals escaping the fire in a safe manner. The system may include additional, less, or alternate actions, including those discussed elsewhere herein.

In another aspect, a non-transitory computer-readable storage medium storing processor-executable instructions may be provided. When executed, the instructions may cause one or more processors to (1) receive, via a first communication network, a first set of sensor data from at least one of the plurality of devices, the first set of sensor data indicative of the fire being present on the property; (2) analyze, by the one or more processors, the first set of sensor data to determine a location of the fire on the property; (3) compare, by the one or more processors, the location of the fire to a list of the plurality of devices, the list including for each device at least one of a location of the device and/or a set of functions that the device is capable of performing to mitigate risks associated with the fire; (4) based upon the comparison, determine, by the one or more processors, a set of actions to be performed by at least a portion of the plurality of devices; and/or (5) direct or control, by the one or more processors, the at least the portion of the plurality of devices to perform the set of actions to facilitate a set of individuals escaping the fire in a safe manner. The instructions may cause additional, less, or alternate actions, including those discussed elsewhere herein.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

DETAILED DESCRIPTION

Figure 1:
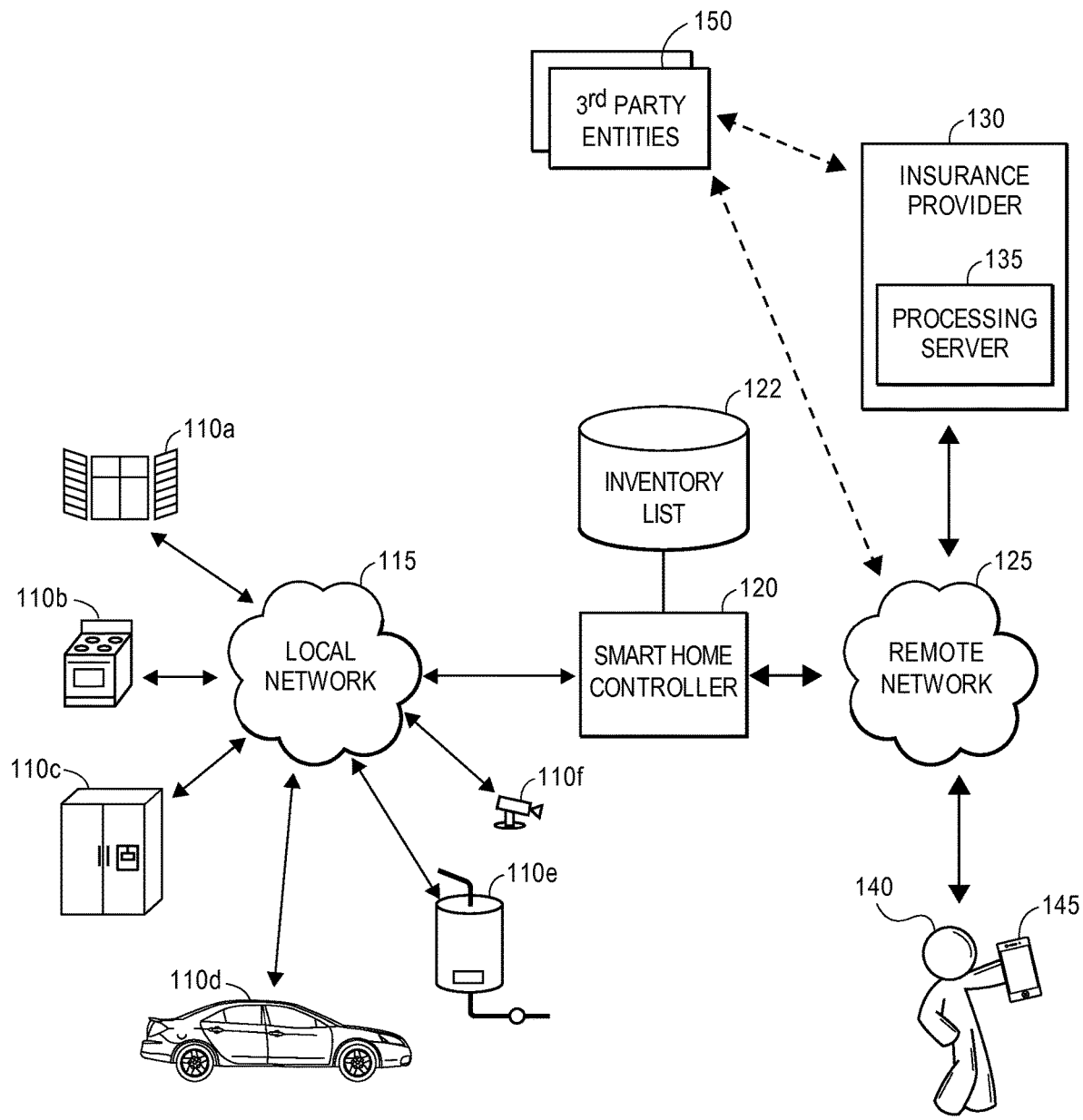
FIG. 1 depicts an exemplary environment including components and entities associated with generating a response to the detection of a fire on a property, in accordance with some embodiments.

The present embodiments may relate to, inter alia, the mitigation, prevention, or other action to avoid risks caused by a fire on a property. The present embodiments may also relate to (a) detecting the presence of the fire; (b) determining a response; (c) directing the performance of the forementioned response; (d) guiding an individual to avoid the fire while escaping; (e) managing insurance policies; (f) communicating with emergency services; and/or (g) other fire response-related activities.

A home may have a "smart" central controller (referred to as a "smart home controller" herein, or "smart building controller" for an office building) and be wirelessly interconnected, or even hard-wired, with various household related items and/or sensors. Despite being referred to as the "smart home controller," the central controller may be associated with any type of property, such as offices, restaurants, farms, and/or other types of properties. The smart home controller may be in wireless or wired communication with various smart appliances (e.g., clothes washer, dryer, dish washer, refrigerator, etc.), smart heating devices (e.g., furnace, space heaters, etc.), smart cooling devices (e.g., air conditioning units, fans, ceiling fans, etc.), smart plumbing fixtures (e.g., toilets, showers, water heaters, piping, interior and yard sprinklers, etc.), smart cooking devices (e.g., stoves, ovens, grills, microwaves, etc.), smart wiring, lighting, and lamps, smart personal vehicles, smart thermostats, smart windows, doors, or garage doors, smart window blinds or shutters, and/or other smart devices and/or sensors capable of wireless or wired communication. Each smart device (or smart sensor), as well as the smart home controller, may be equipped with a processor, memory unit, software applications, wireless transceivers, local power supply, various types of sensors, and/or other components.

Each of the smart devices may be referenced by an inventory list associated with the property. The inventory list may detail a location (e.g., GPS coordinates, a room of the property, an area or section of the property, or other location indication) of each of the smart devices. In this regard, multiple smart devices may be associated with a single area or location of the property (e.g., a basement, a bathroom, a kitchen, a first floor, a hallway, a garage, a master bedroom, a child's bedroom, living room, family room, basement, higher floors for multi-story office buildings, etc.). Similarly, the inventory list may indicate the capabilities of each of the smart devices. For example, a smart fire ladder may be able to remotely receive instructions to deploy a ladder and/or roll the ladder back up. Of course, the capabilities of each smart device may vary between smart devices.

The smart home controller may remotely gather data from the smart devices (or smart sensors) dispersed around or otherwise interconnected within the property. The smart home controller may also receive data from an insurance provider (or other third party sources) that monitors potential risks to the property, such as inclement weather, crime patterns, recall data pertaining to goods disposed on or proximate to the property and/or other risks. The smart home controller may analyze the data and automatically detect the presence of a fire that may pose risks of damage to the property and/or individuals located thereon. Upon detection of a fire, the smart home controller may issue commands or messages via wireless or wired communication networks and/or data transmission that may mitigate the risks of damage.

The smart home controller may remotely gather this data to determine an occupancy state of the property. The occupancy state may indicate whether any individuals are currently located on the premises of the property, whereby the property may be deemed unoccupied if no individuals are currently located within, or in proximity to, the property or may be deemed occupied if at least one individual is located within, or in proximity to, the property. The occupancy state may also include an identity of which room the individuals located on the premises of the property are currently located.

As an example, the smart home controller may detect, via a heat sensor, a visual sensor, an infrared sensor, a sound sensor, and/or a smoke detector, that a fire is present on the property. The smart home controller may check the occupancy state of the property to determine whether any individuals need to evacuate the property. If there are any individuals on the property, the smart home controller may generate an escape route for each individual to safely evacuate the property. The smart home controller may communicate the escape routes to a mobile device associated with each individual. As a result, the mobile devices may display an interface that notifies the individual about the fire (or other emergency situation) and guides the individual along their respective escape route.

To mitigate the risk of damage to the property and/or ensure the safety of the individuals located thereon, the smart home controller may analyze the location of the smart devices compared to locations of the individual, the detected fire, and/or escape routes. The controller may then determine if the capabilities of the smart devices mitigate the risk of damage to the property or the individuals. For example, the smart home controller may transmit an instruction to a smart door that automatically causes the door to open to facilitate an easier escape. It should be appreciated that when there are multiple individuals located on the property, the smart home controller may ensure that performing the action to protect the safety of a first individual does not threaten the safety of a second individual.

The systems and methods discussed herein address a challenge that is particular to home automation. In particular, the challenge relates to a lack of user ability to effectively control certain components within a property while a fire is present. This is particularly apparent when the user is not aware of the fire and/or may not have time to manually perform actions to mitigate risks associated with the fire. For example, an individual may be located in a part of the property currently unaffected by the fire, and proper mitigation may require the individual to risk grievous bodily injury to manually perform a mitigative action. Moreover, during fire events, individuals may panic and be unable to decide on a proper course of action. Instead of requiring users to manually figure out the best way to mitigate damage to the property and/or deploy safety equipment, as required on conventional properties, the systems and methods dynamically determine the most appropriate actions to mitigate damage to the property and/or automatically adjust the operation of the smart devices accordingly. Therefore, because the systems and methods employ dynamic operation of connected devices within a property, the systems and methods are necessarily rooted in computer technology in order to overcome the noted shortcomings that specifically arise in the realm of home and/or building automation.

Similarly, the systems and methods provide improvements in a technical field, namely, home (and/or building) automation. Instead of the systems and methods merely being performed by hardware components using basic functions, the systems and methods employ complex steps that go beyond the mere concept of simply retrieving and combining data using a computer. In particular, the hardware components may compile operation data of connected devices, analyze the operation data, determine the presence of a fire, dynamically adjust device operation, generate escape routes, communicate relevant data between or among a set of devices, and/or alert emergency service providers, among other functionalities. This combination of elements impose meaningful limits in that the operations are applied to improve home automation by improving the consolidation and analysis of operation data, and by facilitating and/or enabling the efficient adjustment of connected device operation in a meaningful and effective way to mitigate risks associated with fires.

According to implementations, the systems and methods may support a dynamic, real-time or near-real-time analysis of any received sensor data. In particular, the central controller and/or insurance provider may retrieve and/or receive real-time sensor data from the smart devices, analyze the sensor data in real time, and dynamically determine a set of actions or commands based upon the analysis. Additionally, the central controller and/or insurance provider may provide, in real-time, the set of actions or commands to the smart device (and/or to another device) to perform the command to manage its operation. Accordingly, the real-time capability of the systems and methods enable the smart devices to dynamically modify their operation to mitigate risks associated with the presence of the fire on the property. Additionally, individuals associated with the property are afforded the benefit of being dynamically notified of the issues so that the individuals may take any additional or alternative mitigating actions.

The systems and methods therefore may offer a benefit by enabling homeowners to receive sufficient warning about fire events and to automatically minimize damage that may be caused by the fire. By communicating these instructions to homeowners, the smart home controller may minimize the risk of harm to devices disposed on the property and/or homeowners (and/or building occupants) themselves. Further, insurance providers may experience a reduction in the number of claims and/or a reduction in the amount claimed as a result of the mitigating the damage caused to the property by the fire, thus reducing their overall liabilities. The present systems and methods may also provide improvements, in certain aspects, to the technological fields of insurance, emergency response, appliance manufacturing, and/or urban planning.

I. EXEMPLARY ENVIRONMENT FOR RESPONDING TO A FIRE

FIG. 1 depicts an exemplary environment 100 associated generating a response to the detection of a fire on a property. Although FIG. 1 depicts certain entities, components, and devices, it should be appreciated that additional or alternate entities and components are envisioned.

As illustrated in FIG. 1, the environment 100 may include a plurality of smart devices 110 that may be connected to a local communication network 115. As shown in FIG. 1, the plurality of smart devices 110 may include smart window shutters 110*a*, a smart oven 110*b*, a smart refrigerator 110*c*, a smart vehicle 110*d*, a smart water supply 110*e*, and/or a smart surveillance camera 110f. Although FIG. 1 depicts six smart devices in the environment 100, it should be appreciated that additional or fewer smart devices may be present in other embodiments. In some cases, the smart devices may be purchased from the manufacturer with the "smart" functionally incorporated therein. In other cases, the smart devices may have been purchased as "dumb" devices and subsequently modified to add the "smart" functionality to the device. For example, a homeowner may install a motor system on window shutters that is capable of transmitting the open/close status of the shutters, and/or remotely receiving instructions to open or close the shutters. As another example, when a vehicle owner enrolls in a usage-based vehicle insurance policy, the vehicle owner may be provided a smart device that is able to monitor the miles driven by the vehicle and, upon returning to the home, the smart device may communicate the number of miles driven since previously departing.

The plurality of smart devices 110 may be configured to communicate with a smart home controller 120 via the local communication network 115. The local network 115 may facilitate any type of data communication between devices and controllers located on or proximate to the property via any standard or technology (e.g., Bluetooth®, RFID, X10, UPnP®, IEEE 802 including Ethernet, GSM, CDMA, LTE, and/or others). According to present embodiments, the plurality of smart devices 110 may transmit, to the smart home controller 120 via the local network 115, sensor data gathered from sensors associated with the plurality of smart devices 110. The sensor data may be audio data, image or video data, or status data. For example, the sensor data may indicate the presence of smoke, thermal imaging data, the status of an alarm, sound detected by a smart device, and/or other information pertinent to determining the presence of a fire.

The smart home controller 120 (or other smart building controller) may analyze the received sensor data and transmit, via the local network 115, instructions or commands to the plurality of smart devices 110. As an example, the smart home controller 120 may determine, via a heat sensor, that there is a fire in a bedroom. As a result, the smart home controller 120 may transmit an instruction to activate a fire-suppressant and/or other actions to mitigate the risks associated with the fire. In some embodiments, the smart fire suppressant may respond by transmitting, to the smart home controller 120 via the local network 115, a confirmation that the action has been successfully performed.

According to present embodiments, the smart home controller 120 may be coupled to a database 122 that stores a list of smart devices on the property, such as the plurality of smart devices 110. In some embodiments, for each smart device listed in the database 122, the database 122 may contain a corresponding location of the smart device and/or a set of functions that the smart device is capable of performing. In some embodiments, the location of the smart device may indicate a specific location on a layout or virtual map of the property (whether a virtual map of a family home, multi-story office building, apartment building, or other type of structure, such as a luxury cruise ship). The smart home controller 120 may access the database 122 to determine a portion of the plurality of devices 110 located near the fire and/or that are capable of performing functions that mitigate the risks associated with the fire. Although FIG. 1 depicts the database 122 as coupled to the smart home controller 120, it is envisioned that the database 122 may be maintained in the "cloud" such that any element of the environment 100 capable of communicating over either the local network 115 or a remote network 125 may directly interact with the database 122.

The smart home controller 120 may also be in communication, via the remote network 125, with an electronic device 145 associated with the homeowner 140. The electronic device 145 associated with the homeowner 140 may be a smartphone, a desktop computer, a laptop, a tablet, a smart watch, smart glasses, phablet, smart contact lenses, wearable electronics, pager, personal digital assistant, computing device configured for wireless communication, or any other electronic device. The remote network 125 may facilitate any data communication between the smart home controller 120 located on the property and entities or individuals remote to the property via any standard or technology (e.g., GSM, CDMA, TDMA, WCDMA, LTE, EDGE, OFDM, GPRS, EV-DO, UWB, IEEE 802 including Ethernet, WiMAX, and/or others). In some cases, both the local network 115 and the remote network 125 may utilize the same technology. Although FIG. 1 depicts the smart home controller 120 and the homeowner 140 in communication via the remote network 125, there are embodiments in which the homeowner 140 is on the property and in communication with the smart home controller 120 via the local network 115.

In some embodiments, when the smart home controller 120 determines that a fire is present on the property, the smart home controller 120 may generate and transmit notification to the electronic device 145 via the local network 115 and/or the remote network 125. The notification may include, inter alia, a location of the fire, a generated escape route (including instructions) to evacuate the property safely, visual location data depicting the escape route on a floor plan and/or map, safety tips to remember while evacuating, and/or any other information relevant to safely evacuating a property that is on fire. In some embodiments, the electronic device 145 may provide an interface such that the homeowner 140 may view any of the transmitted information. The interface may also enable the homeowner 145 to monitor, in substantially real time, a current location of the homeowner 145, a current status of the areas of the property made unsafe by the fire, progress along the escape route, and/or the like.

The smart home controller 120 may also be in communication with an insurance provider 130 via the remote network 125. According to present embodiments, the insurance provider 130 may include one or more processing servers 135 configured to facilitate the functionalities described herein. Although FIG. 1 depicts the insurance provider 130, it should be appreciated that other entities that are capable of monitoring a property to detect fires are envisioned. For example, a fire department or other entity tasked with responding to fires may utilize the systems and methods to receive accurate information about the location of a fire and/or any individuals trapped by the fire to develop optimal fire rescue strategies. Thus, it may not be necessary for the property to have an associated insurance policy for the property owners to enjoy the benefits of the systems and methods. Further, although FIG. 1 depicts the processing server 135 as part of the insurance provider 130, it should be appreciated that the processing server 135 may be separate from (and connected to and/or accessible by) the insurance provider 130 or other entity interested in monitoring the data described herein. In any event, the processing server 135 may be configured to perform an insurance-related action (e.g., generating an insurance claim) in response to the detection of the fire.

According to present embodiments, the insurance provider 130 and/or smart home controller 120 may also be in communication with third party entities 150 pertaining to the detection of the fire on the property. For example, the smart home controller 120 and/or the processing sever 135 may transmit an alert to an emergency service provider informing the emergency service provider as to the presence of the fire. In response, the emergency service provider may dispatch responders to the property to extinguish the fire and/or otherwise mitigate damage caused by the fire. The exemplary environment 100 may include additional, fewer, or alternate equipment or components, including those discussed elsewhere herein.

II. EXEMPLARY FIRE RESPONSE COMMUNICATION

Figure 2:
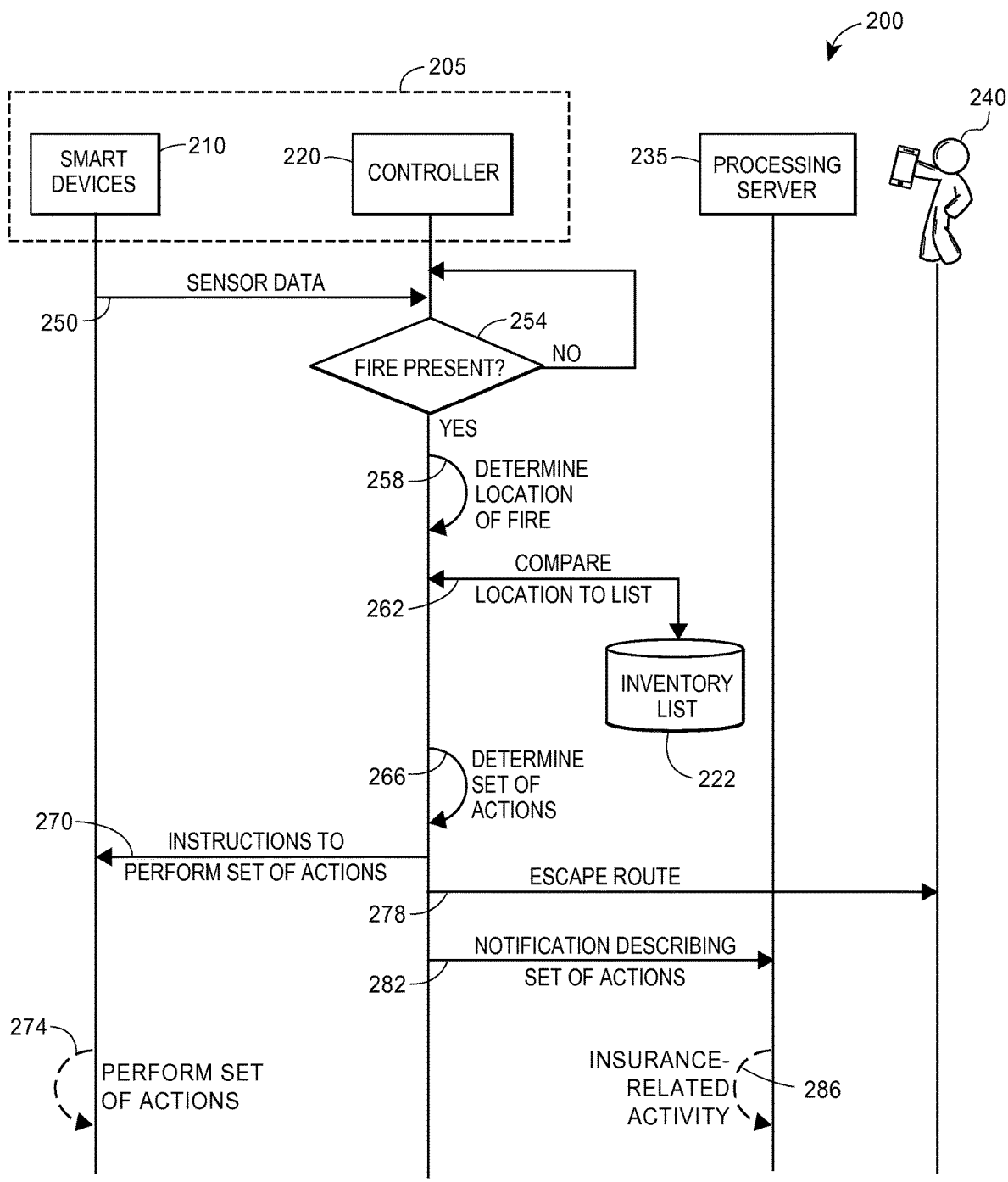
FIG. 2 depicts an exemplary signal diagram associated with generating a response to the detection of a fire on a property, in accordance with some embodiments.

Referring to FIG. 2, illustrated is a signal diagram 200 associated with generating a response to the detection of a fire on a property. In particular, FIG. 2 may include a plurality of smart devices 210 (such as the plurality of smart devices 110 as described with respect to FIG. 1) disposed on a property 205, a smart home controller 220 (such as the smart home controller 120 as described with respect to FIG. 1, or a smart office building controller, or even a smart ship controller), a processing server 235 (such as the processing server 135 as described with respect to FIG. 1), and/or an individual 240 (such as the homeowner 140 as described with respect to FIG. 1) associated with an electronic device. In some embodiments, the smart home controller 220 may be coupled to a database 222 that stores an inventory list (such as the inventory list 122 as described with respect to FIG. 1). It should be appreciated the electronic device may be any electronic device (e.g., a smartphone, a desktop computer, a laptop, a tablet, a phablet, netbook, notebook, a smart watch, smart glasses, smart contact lenses, wearable electronics device, other mobile device, etc.).

The signal diagram 200 may begin when the plurality of smart devices 210 transmit (250) sensor data to the smart home controller 220 (or other types of controllers, including those discussed elsewhere herein). The sensor data may include data, such as audio data, visual data, and status data, relevant to determining the presence of a fire and/or smoke on the property 205. The smart devices 210 may be configured to transmit the sensor data at a regular interval (e.g., every ten seconds) and/or in response to a trigger event (e.g., detecting the presence of smoke). It should be appreciated the length of the regular interval may vary based upon the type of each smart device 210 and the operational state of each smart device 210.

After receiving the sensor data from the plurality of smart devices 210, the smart home controller 220 may analyze the received data to determine (254) whether a fire is present on the premises of the property 205 and/or determine an extent of the fire. For example, the smart home controller 220 may analyze the received thermal imaging data to determine the presence of an abnormal heat condition indicative of a fire. As another example, the smart home controller 220 may then analyze status data from a smart smoke detector to determine the presence of smoke proximate to the smart smoke detector. In yet another example, the smart home controller 220 may analyze received audio data to detect that an audio pattern indicative of the presence of a fire. Of course, the smart home controller 220 may analyze any received data to determine the presence of a fire on the premises of the property 205.

If the smart home controller 220 analyzes the received data and determines that a fire does not currently exist on the premises of the property 205 ("NO"), processing may return to the beginning of the signal diagram 200 where the smart home controller 220 may await new data from the smart devices 210. In contrast, if the smart home controller 220 determines that there is a fire on the premises of the property 205 ("YES"), the smart home controller 220 may determine (258) a location of the fire. In some embodiments, the smart home controller 220 may determine the location of the fire by analyzing the source of the sensor data that indicated the presence of the fire. For example, if the sensor data that indicated the presence of the fire originated from a thermal sensor, then the smart home controller 220 may query the inventory list 222 to determine a location of the thermal sensor. In this example, if the inventory list 222 indicates that the thermal sensor is located and/or monitors the kitchen, the smart home controller 220 may determine that the fire is located in the kitchen. It should be appreciated, that in some scenarios, the fire may be located in a plurality of locations on the premises of the property 205 (such as on a first or fifth floor of a building or the third deck of a ship). Accordingly, the smart home controller 220 may determine a plurality of locations at which the fire is located.

Upon determining the location(s) of the fire, the smart home controller 220 may then compare (262) the determined location(s) of the fire to a list of smart devices stored in the inventory list 222. In particular, the smart home controller 220 may analyze location data associated with the plurality of devices 210 within the inventory list 222 to identify a set of smart devices that may potentially perform actions to mitigate risks associated with the fire. For example, the set of smart devices may initially include a list of smart devices in the same room (and/or on the same floor or level of a structure) as the fire and/or proximate to the fire. The smart controller 220 may then analyze the functionality supported by the smart devices within the set of smart devices to exclude smart devices that are incapable of performing actions to mitigate risks associated with the fire.

For example, if the fire is proximate to a smart water valve and a smart oven, the smart home controller 220 may determine that the smart water valve is unable to perform a function to mitigate risks associated with the fire whereas the smart oven may be capable of shutting off a power and/or gas flow into the smart oven. Accordingly, the smart home controller 220 may exclude and/or remove the smart water valve from the set of smart devices.

Additionally, the inventory list 222 may also track the location and/or occupancy state of the individual 240 while on the premises of the property 205 and/or otherwise have access to such information. Accordingly, the smart home controller 220 may determine that the individual 240 needs to evacuate the fire. In these scenarios, the smart home controller 220 may additionally compare the location of the individual 240 to the locations of the plurality of smart devices 210 in generating the set of smart devices. It should be understood that the set of data determinative of the presence of the individual 240 may be distinct from the set of data detecting the presence of the fire.

Based upon the comparison between the location of the fire and/or the individual 240 to the location of the plurality of smart devices 210, the smart home controller 220 may determine (266) a set of actions to mitigate the risks associated with the fire. Accordingly, the set of actions may include the performance of any functionality that caused the smart device to be included and/or remain in the set of smart devices (and/or a subset thereof). The set of actions may vary based upon the presence of the individual 240 on the premises of the property 205. For example, if the smart home controller 220 detects the presence of the individual 240 on the premises of the property 205, the smart home controller 220 may prioritize actions that facilitate the safe evacuation of the individual 240. Conversely, if the smart home controller 220 determines that the individual 240 is not located on the premises of the property 205, the smart home controller 220 may prioritize actions that facilitate a reduction in property damage caused by the fire. The differences between these priorities may be emphasized when the plurality of devices 210 includes one or more smart doors.

If the smart home controller 220 detects the presence of the individual 240 on the premises of the property 205, then the smart home controller 220 may determine that the set of actions includes opening a smart door (or smart window) to facilitate a faster evacuation. On the other hand, if the smart home controller 220 detects that the individual 240 is not present on the premises of the property 205, the smart home controller 220 may determine that the set of actions includes closing a smart door (or smart window) to facilitate the containment and/or suppression of the fire.

In embodiments in which the individual 240 is present and/or located on the premises of the property 205, the smart home controller 220 may generate an escape route for the individual 240. The escape routes may guide the individual 240 to a safe zone unaffected by the fire. To this end, the plurality of devices 210 may include smart evacuation equipment (e.g., an escape ladder, a rope, a set of stairs, etc.). If the escape route utilizes the smart evacuation equipment, then the smart home controller 220 may determine that the set of actions includes the deployment of the smart evacuation equipment, wherein deploying the smart evacuation equipment enables the smart evacuation equipment to become usable by the individual 240. Additionally, the smart home controller 220 may determine that the set of actions includes activating a lighted path and/or track lighting to further assist in guiding the individual 240 along the escape route.

Once the set of actions is determined, the smart home controller 220 may generate and transmit (270) instructions that cause the plurality of smart devices 210 to perform (274) the set of actions. The instructions may include an identity of the particular smart device 210 to perform the action and/or an action code associated with the particular functionality of each smart device 210. Each smart device 210 may analyze the instructions to determine whether the instructions identify that the particular smart device 210 should perform any actions. If the particular smart device 210 is to perform an action, the particular smart device 210 may analyze the action code to actually perform the instructed action. As an example, a smart water sprinkler may be identified as device abc123 and an action code of "ActivateSprinkler" may cause the smart water sprinkler to activate its sprinkler systems. Accordingly, if the smart water sprinkler determines that the instructions contain an instruction that device abc123 should perform the action "ActivateSprinkler," the smart water sprinkler may activate its sprinkler systems.

If the smart home controller 220 detected the presence of the individual 240, the smart home controller 220 may also transmit (278) the escape route to the electronic device associated with the individual 240 via a communication network. After receiving the escape route, the electronic device may present the escape route to the individual 240. In some embodiments, this may include displaying a visual interface that depicts the escape route, and/or individual steps of the escape route superimposed on a map and/or a floor plan of the property 205. For example, an escape route that leads the individual 240 to a neighboring property may initially be displayed on a floor plan of the property 205; however, once the individual 240 leaves the premises of the property 240, the escape route may be displayed via a mapping program stored on the electronic device (e.g., Google Maps®). Additionally or alternatively, the electronic device may recite directions (such as audibly or visually) that guide the individual 240 along the escape route. It should be appreciated that any suitable method in which the electronic device may guide the individual 240 along the escape route is envisioned.

According to aspects, the smart home controller 220 may also transmit (282) a notification to the processing server 235. The notification may include an indication describing the set of actions (and/or a subset thereof) performed by the plurality of smart devices 210. In response, the processing server 235 may perform (286) an insurance related action. For example, the insurance-related action may include automatically generating an insurance claim for damage caused by the fire and/or appending received sensor data to the generated insurance claim. Additionally, in response to detecting the emergency situation, the smart home controller 220 may automatically alert an emergency services provider (not depicted) about the presence of the fire on the premises of the property 205. It should be appreciated that the signal diagram 200 may include additional, fewer, and/or alternative actions, including those discussed elsewhere herein. For example, in some embodiments, some of the actions described with respect to the smart home controller 220 may be alternatively performed by the processing server 235, and vice versa.

III. EXEMPLARY SMART DOOR BEHAVIOR

Figure 3C:
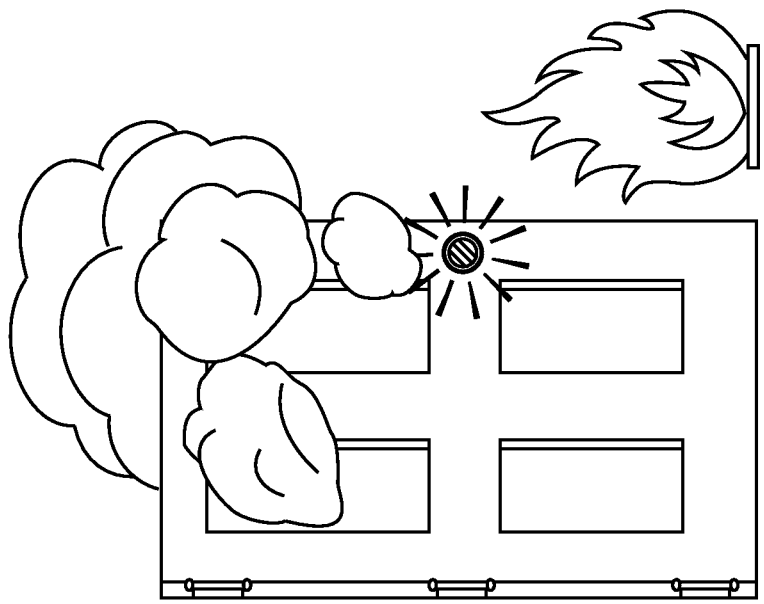
FIG. 3A-3C illustrate an exemplary response to the detection of a fire as performed by a smart door, in accordance with some embodiments.
Figure 3B:
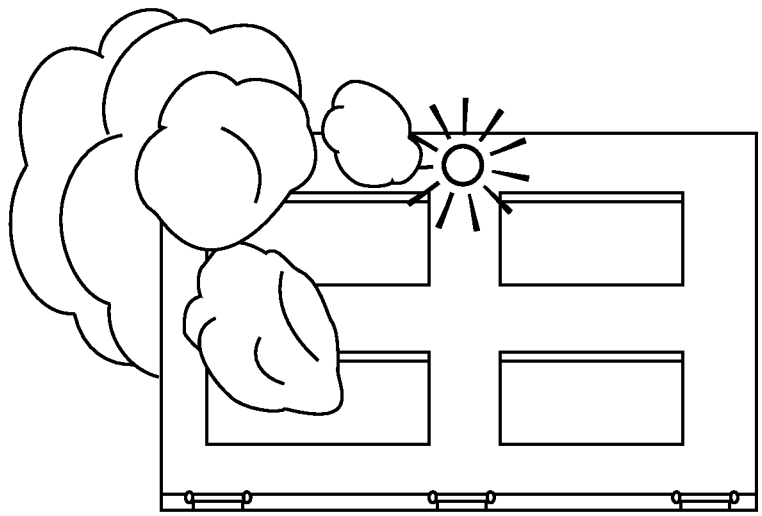
Figure 3A:
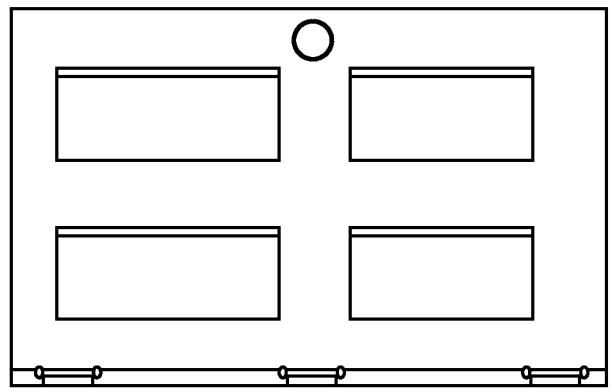

FIGS. 3A-3C illustrate exemplary responses to the detection of a fire as performed by a smart door. In accordance with some embodiments, a smart door may comprise smart hinges and/or smart door knobs. In response to remotely receiving instructions, the smart door may cause the corresponding smart hinges to change and/or alter a navigation state of the smart door (i.e., open and/or close the smart door). Additionally, the smart door knobs may include a lighting element capable of illuminating the smart knob in a plurality of colors and/or a heat sensor configured to detect and/or monitor a temperature proximate to the smart door. It should be appreciated that the responses depicted in FIGS. 3A-3C are merely examples and that alternative or additional responses are envisioned.

FIG. 3A illustrates a smart door under normal operating conditions (i.e., no fire is present on the property). It should be appreciated that the door knob is not illuminated and, generally, looks like an ordinary door without smart capabilities. Although the smart door is depicted in a shut state, it should be appreciated that the smart door may alternatively be in an open state and/or a partially open state.

FIG. 3B illustrates a smart door that is responding to the presence of smoke proximate to the smart door. The presence of the smoke may have been detected by a smart smoke detector disposed in the same room as the smart door. In response to the smart smoke detector transmitting an indication that smoke is present in the room, a smart controller (such as the smart home controllers 120 and/or 220) may determine a set of actions that includes causing the smart door to illuminate a smart door knob. It should be appreciated that in some embodiments, smoke may only be present on a single side of the smart door. In these embodiments, the set of actions may include only illuminating the smart door knob on the side of the door in which smoke is present. Upon receiving an instruction from the smart home controller, the smart door may cause a corresponding smart door knob to glow and/or become illuminated, as depicted in FIG. 3B. The illumination may increase visibility of the smart door and/or smart door knob, resulting in a more efficient evacuation.

Additionally, if the smart door is initially in an open and/or partially open navigational state, the smart home controller may determine that the set of actions may include an instruction to change the navigational state of the smart door to shut. It should be appreciated that the smart home controller may ensure that shutting the smart door does not interfere and/or otherwise hinder an individual from proceeding along an escape route. Accordingly, in response to receiving an instruction to change a navigational state to shut, the smart door may cause the corresponding smart hinges to rotate in a manner to shut and/or close the smart door.

FIG. 3C illustrates a smart door that is responding to the presence of a fire proximate to the smart door. The presence of the fire may be detected by thermal sensors disposed in the same room as the smart door. In some embodiments, the smart door may comprise thermal sensors in one or more corresponding smart door knobs. Accordingly, the smart home controller may determine that the temperatures indicated by both smart door knobs are above a certain threshold and that one of the temperatures is significantly hotter than the other. In such an example, the smart home controller may determine that a fire is proximate to the smart door on the side indicating the hotter temperature. As a result, the smart home controller may determine that a set of actions includes causing a smart door knob corresponding to the smart door to illuminate in a manner that warns and/or alerts an individual to the presence of the fire. It should be appreciated that the smart door knob illuminated in this manner may be the smart door knob disposed on the opposite side of the door as to the location of the fire.

Moreover, as depicted in FIG. 3C, the color in which the smart door knob is illuminated in response to the proximity of a fire may be a distinct color as to the color in which the smart door knob is illuminated in response to the proximity of smoke. In scenarios in which both smoke and fire are proximate to the smart door, the smart home controller may generate instructions to illuminate the smart door knob in a color indicative of the presence of fire.

IV. EXEMPLARY METHOD OF RESPONDING TO A FIRE

Figure 4:
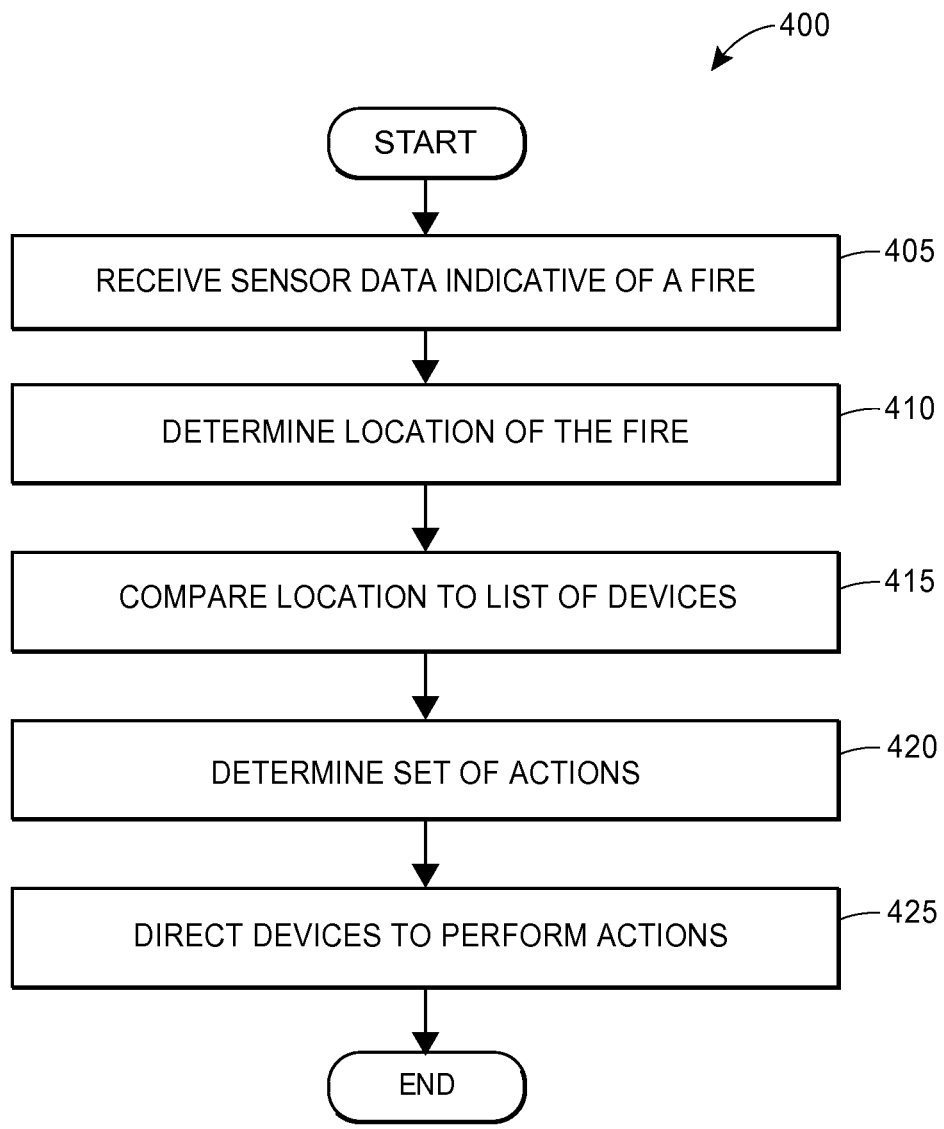
FIG. 4 depicts an exemplary flow diagram associated with generating a response to the detection of a fire on a property, in accordance with some embodiments.

Referring to FIG. 4, depicted is a block diagram of an exemplary method 400 of generating a response to the detection of a fire on a property. The method 400 may be facilitated by a hardware ("smart home") controller within the property, such as one of the smart home controllers 120 or 220, that may be in direct or indirect communication with an plurality of smart devices (such as one of the pluralities of smart devices 110 or 210).

The method 400 may begin when the controller receives (block 405) sensor data indicative of a fire on the premises of the property from the plurality of devices disposed on the property. For example, the sensor data may include data indicating a fire alarm in a bedroom has been triggered and/or thermal sensor data indicating the presence of a fire in the bedroom. In some scenarios, the sensor data may additionally or alternatively indicate the presence of smoke on the premises of the property. In some embodiments, the sensor data may comprise data generated by thermal and/or heat sensors, smoke detectors, thermal imaging sensors, or any other sensor capable of determining the presence a fire and/or smoke on a property.

Once the controller determines that there is a fire present on the property, the controller may determine (block 410) a location on the property at which the fire is currently located and/or risks damaging persons and/or property. The determined location may include a GPS location, a coordinate associated with the property, and/or an identity of a room. To determine the location of the fire, the controller may determine a location of any sensor that generated data indicating the presence of the fire. For some sensors, the location of the sensor and the location of the property monitored by the sensor may be distinct locations. Accordingly, the controller may select the appropriate location based upon the type of sensor generating the sensor data. For example, a thermal camera located in a living room may be configured to receive data indicative of a thermal condition corresponding to an adjacent kitchen.

Upon determining the location of the fire, the controller may compare (block 415) the location of the fire to a list of devices on the property (such as an inventory list). In particular, the controller may compare the determined location of the fire to a plurality of locations respectively corresponding to the listed plurality of devices. For example, if the determined location of the fire is a basement, the controller may query the list to determine which of the plurality of smart devices are also located in the basement. In some cases, the smart device may be disposed in a different location than the room of which the smart device controls a condition. For example, a smart fuse controlling power to the basement may be disposed in a hallway closet. Accordingly, for each smart device in the list, the list may maintain a room in which the smart device is disposed as well as a set of rooms that the smart device may control and/or affect conditions associated therewith.

As a result of the comparison, the controller may determine a portion of the plurality of devices that are capable of performing functions that mitigate the risks associated with the fire and/or a presence thereof. Upon determining the portion of devices, the controller may then determine (block 420) an action for each of the portion of the plurality of devices to mitigate the aforementioned risks. As a result, the controller may determine a set of actions that may be performed by the portion of the plurality of devices. Some exemplary types of actions that may be included in the set of actions includes causing smart evacuation equipment to deploying, energizing smart emergency lighting, altering a navigation state of a smart door, de-energizing smart electronics, closing gas valves, activating sprinkler systems, and/or any other action that can mitigate the risk of damage to persons and/or property.

The controller may direct (block 425) devices disposed on the property to perform the set of actions. In some implementations, the controller may generate an instruction that, when received by a particular device, causes the device to perform a particular action of the set of actions. This instruction may be communicated over a local network. In some embodiments, the instruction may include an identification of the device to perform the action, an indication of device property to change, an indication of a value of the new device property, a time when the device property should change, and/or any other pertinent information to controlling a smart device.

In some implementations, in addition to directing the devices to perform the action, the controller may generate and/or communicate an escape route to an electronic device associated with the corresponding individual present on the property. The communication may provide the nature and location of the emergency situation, a layout of the property, step-by-step instructions directing the individual along the escape route, and/or any other information pertinent to the individual safely evacuating the property.

In some further implementations, the controller may also communicate a notification and/or an alert to an insurance provider associated with the property (e.g., the insurance provider 130). In response the insurance provider may perform an insurance-related action, such as automatically prepopulating an insurance claim. Additionally, the controller may communicate an alert to an emergency services provider informing the emergency services provider as to the presence of the fire on the premises of the property. As a result, the emergency services provider may dispatch a responder to facilitate mitigating risks of damage caused by the presence of the fire. The method 500 may include additional, less, or alternate actions, including those discussed elsewhere herein.

V. EXEMPLARY FIRE RESPONSE METHOD

In one aspect, a computer-implemented method of responding to a fire on a property may be provided. The property may be populated with a hardware controller in communication with a plurality of devices and each of the plurality of devices may be configured to monitor various conditions associated with the property. The method may include (1) receiving, by the hardware controller via a first communication network, a first set of sensor data from at least one of the plurality of devices, the first set of sensor data indicative of the fire being present on the property; (2) analyzing, by one or more processors, the first set of sensor data to determine a location of the fire on the property; (3) comparing, by the one or more processors, the location of the fire to a list of the plurality of devices, the list including for each device at least one of a location of the device and/or a set of functions that the device is capable of performing to mitigate risks associated with the fire; (4) based upon the comparison, determining, by the one or more processors, a set of actions to be performed by at least a portion of the plurality of devices; and/or (5) directing or controlling, by the one or more processors, the at least the portion of the plurality of devices to perform the set of actions to facilitate a set of individuals escaping the fire in a safe manner. The method may include additional, less, or alternate actions, including those discussed elsewhere herein, and/or may be implemented via one or more local or remote processors (such as smart home controllers, smart office building controllers, smart ship controllers, mobile devices, insurance provider remote servers, etc.) and/or computer-executable instructions stored on non-transitory computer-readable medium or media.

For instance, the plurality of smart devices may include a smart door. Accordingly, directing or controlling the at least the portion of the plurality of devices may include directing or controlling, by the one or more processors, the smart door to cause a corresponding smart hinge to perform at least one of opening the smart door or closing the smart door.

Directing or controlling the smart door may include (1) receiving, by the hardware controller via a first communication network, a second set of sensor data from at least one of the plurality of devices, the second set of sensor data indicative of the presence of the set of individuals on the property; (2) analyzing, by one or more processors, the second set of sensor data to determine the number of individuals within the set of individuals present on the property; (3) when the set of individuals present on the property includes no individuals, directing or controlling, by the one or more processors, the smart door to close to facilitate fire suppression; and/or (4) when the set of individuals present on the property includes at least one individual, directing or controlling, by the one or more processors, the smart door to open to facilitate evacuation by the set of individuals.

Directing or controlling the at least the portion of the plurality of devices may include (1) analyzing, by one or more processors, the first set of sensor data to determine a location of smoke on the property; (2) comparing, by the one or more processors, the location of the smoke to a location of the smart door; and/or (3) when the location of the smoke is proximate to the location of the smart door, directing or controlling, by the one or more processors, the smart door to cause a corresponding smart door knob to glow and/or change color to increase a visibility of the smart door. Similarly, directing or controlling the at least the portion of the plurality of devices may include (1) comparing, by the one or more processors, the location of the fire to a location of the smart door; and/or (2) when the location of the fire is proximate to the location of the smart door, directing or controlling, by the one or more processors, the smart door to cause a corresponding smart door knob on a first side of the smart door to be illuminated in a color indicative of the fire being located proximate to a second side of the smart door. Receiving the first set of sensor data may include receiving, from a heat sensor located in a smart door knob corresponding to the smart door, a portion of the first set of sensor data.

The method may include the at least the portion of the plurality of devices including smart evacuation equipment. The smart evacuation equipment may include at least one of an escape ladder, a rope, and/or a set of stairs. Directing or controlling the at least the portion of the plurality of devices may include directing or controlling, by the one or more processors, a portion of the smart evacuation equipment to deploy, wherein deploying causes the smart evacuation equipment to become usable by the set of individuals.

The method may include transmitting, to an insurance provider associated with the property, a notification, wherein the notification includes an indication of at least one of the set of actions. Transmitting the notification may cause the insurance provider to perform an insurance-related action. The method may also include transmitting, to an emergency services provider, an alert, wherein the alert indicates that the fire is present on the property.

Determining the set of actions may include (1) generating, by the one or more processors, an escape route for an individual located on the premises of the property; and/or (2) transmitting, to an electronic device associated with the individual, the escape route.

VI. EXEMPLARY FIRE RESPONSE SYSTEM

In one aspect, a system for responding to a fire on a property may be provided. The property populated with a hardware controller in communication with a plurality of devices and each of the plurality of devices may be configured to monitor various conditions associated with the property. The system may include (i) a plurality of transceivers adapted to communicate data; (ii) a memory adapted to store non-transitory computer executable instructions; and/or (iii) one or more processors adapted to interface with the plurality of transceivers. The one or more processors may be configured to execute the non-transitory computer executable instructions to cause the system to (1) receive, by the plurality of transceivers, a first set of sensor data from at least one of the plurality of devices, the first set of sensor data indicative of the fire being present on the property; (2) analyze, by the one or more processors, the first set of sensor data to determine a location of the fire on the property; (3) compare, by the one or more processors, the location of the fire to a list of the plurality of devices, the list including for each device at least one of a location of the device and/or a set of functions that the device is capable of performing to mitigate risks associated with the fire; (4) based upon the comparison, determine, by the one or more processors, a set of actions to be performed by at least a portion of the plurality of devices; and/or (5) direct or control, by the one or more processors, the at least the portion of the plurality of devices to perform the set of actions to facilitate a set of individuals escaping the fire in a safe manner. The system may include additional, less, or alternate actions, including those discussed elsewhere herein.

For instance, to direct or control the at least the portion of the plurality of devices, the one or more processors may be configured to execute the non-transitory computer executable instructions to cause the system to direct or control, by the one or more processors, a smart door to cause a corresponding smart hinge to perform at least one of opening the smart door and/or closing the smart door.

To direct or control the smart door, the one or more processors may be configured to execute the non-transitory computer executable instructions to cause the system to (1) receive, by the plurality of transceivers, a second set of sensor data from at least one of the plurality of devices, the second set of sensor data indicative of the presence of the set of individuals on the property; (2) analyze, by one or more processors, the second set of sensor data to determine the number of individuals within the set of individuals present on the property; (3) when the number of individuals is zero, direct or control, by the one or more processors, the smart door to close to facilitate fire suppression; and/or (4) when the number of individuals is at least one, direct or control, by the one or more processors, the smart door to open to facilitate evacuation by the set of individuals.

To direct or control the at least the portion of the plurality of devices, the one or more processors may be configured to execute the non-transitory computer executable instructions to cause the system to (1) analyze, by one or more processors, the first set of sensor data to determine a location of smoke on the property; (2) compare, by the one or more processors, the location of the smoke to a location of the smart door; and/or (3) when the location of the smoke is proximate to the location of the smart door, direct or control, by the one or more processors, the smart door to cause a corresponding smart door knob to glow or change color to increase a visibility of the smart door. Additionally, to direct or control the at least the portion of the plurality of devices, the one or more processors may be configured to execute the non-transitory computer executable instructions to cause the system to (1) compare, by the one or more processors, the location of the fire to a location of the smart door; and/or (2) when the location of the fire is proximate to the location of the smart door, direct or control, by the one or more processors, the smart door to cause a corresponding smart door knob on a first side of the smart door to be illuminated in a color indicative of the fire being located proximate to a second side of the smart door.

The system may include the at least the portion of the plurality of devices including smart evacuation equipment. The smart evacuation equipment may include at least one of an escape ladder, a rope, and/or a set of stairs. To direct or control the at least the portion of the plurality of devices, the one or more processors may be configured to execute the non-transitory computer executable instructions to cause the system to direct or control, by the one or more processors, a portion of the smart evacuation equipment to deploy. Deploying may cause the smart evacuation equipment to become usable by the set of individuals.

The one or more processors may be further configured to execute the non-transitory computer executable instructions to cause the system to transmit, by the plurality of transceivers, a notification. The notification may include an indication of at least one of the set of actions, and transmitting the notification may cause an insurance provider to perform an insurance-related action. Additionally or alternatively, to determine the set of actions, the one or more processors may be configured to execute the non-transitory computer executable instructions to cause the system to (1) generate, by the one or more processors, an escape route for an individual located on the premises of the property; and/or (2) transmit, by the plurality of transceivers, the escape route to an electronic device associated with the individual.

VII. EXEMPLARY SMART HOME CONTROLLER

Figure 5:
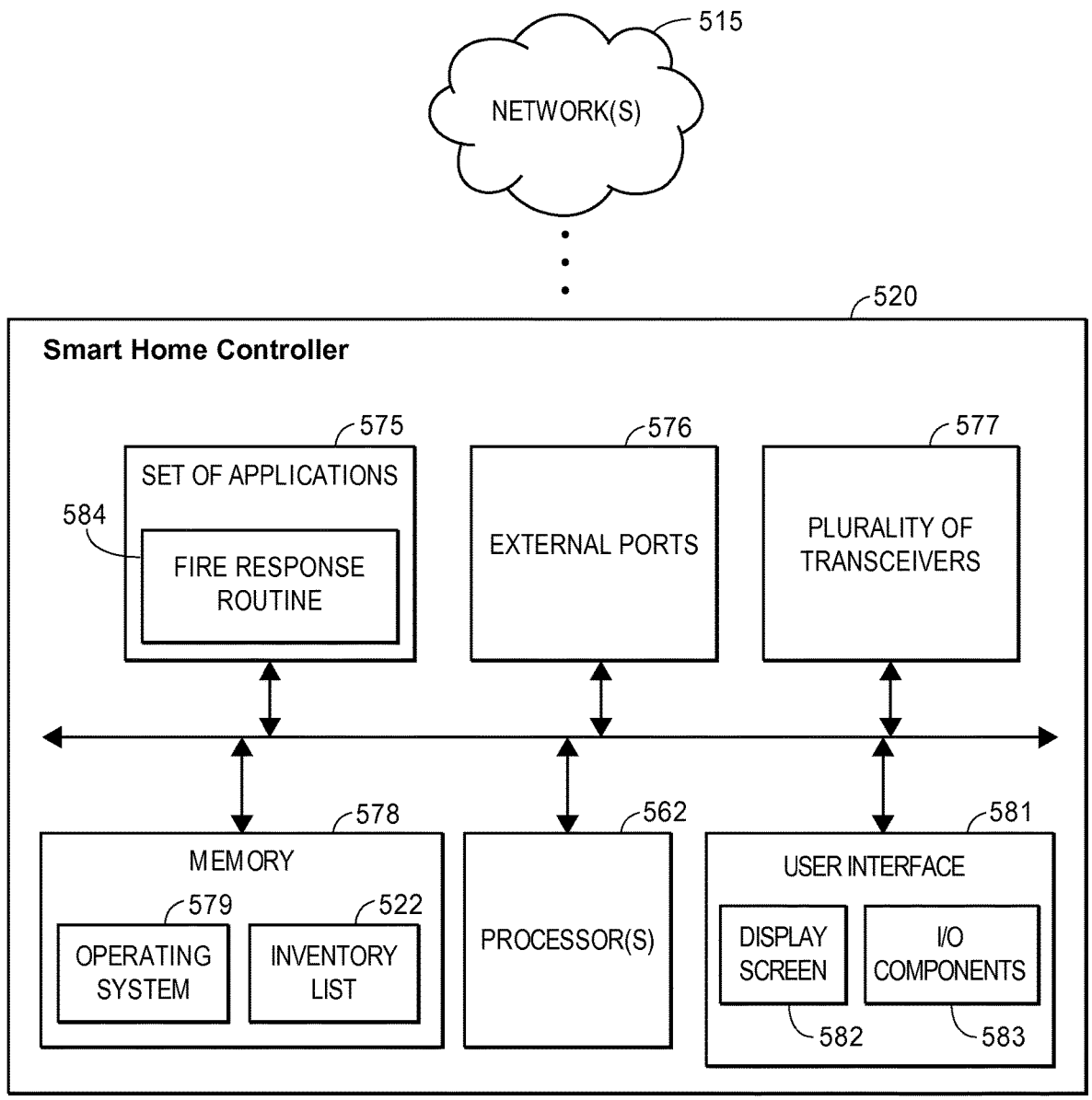
FIG. 5 depicts a block diagram of a smart home controller, in accordance with some embodiments.

FIG. 5 illustrates a diagram of an exemplary smart home controller 520 (such as the smart home controller 120 as discussed with respect to FIG. 1) in which the functionalities as discussed herein may be implemented. It should be appreciated that the smart home controller 520 may be associated with a property, as discussed herein.

The smart home controller 520 may include a processor 562, as well as a memory 578. The memory 578 may store an operating system 579 capable of facilitating the functionalities as described herein. The smart home controller 520 may also store a set of applications 575 (i.e., machine readable instructions). For example, one application of the set of applications 575 may be a fire response routine 584 configured to cause a plurality of smart devices to perform actions that mitigate the risks associated with the presence of a fire on the property. It should be appreciated that other applications may be included in the set of application 575.

The processor 562 may interface with the memory 578 to execute the operating system 579 and the set of applications 575. According to some embodiments, the memory 578 may also include an inventory list 522 that includes information related to the plurality of smart devices disposed on the premises of the property. The fire response routine 584 may access the inventory list 522 to determine an appropriate response to the presence of the fire. The memory 578 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The smart home controller 520 may further include a plurality of transceivers 577 configured to communicate data via one or more networks 515. Network(s) 515 may include both a local network for communicating between devices mounted on, or proximate to, the property and a remote network for communicating between the property and external parties. According to some embodiments, the plurality of transceivers 577 may include one or more transceivers (e.g., WWAN, WLAN, and/or WPAN transceivers) functioning in accordance with IEEE standards, 3GPP standards, or other standards, and configured to receive and transmit data via one or more external ports 576. In some embodiments, the plurality of transceivers 577 may include separate transceivers configured to interact with the local and remote networks separately.

The smart home controller 520 may further include a user interface 581 configured to present information to a user and/or receive inputs from the user. As shown in FIG. 5, the user interface 581 may include a display screen 582 and I/O components 583 (e.g., ports, capacitive or resistive touch sensitive input panels, keys, buttons, lights, LEDs, speakers, microphones). According to the present embodiments, the user may access the smart home controller 520 via the user interface 581 to monitor the status of the plurality of smart devices associated with a property, control the plurality of smart devices associated with the property, indicate evacuation preferences and/or limitations, and/or perform other functions. In some embodiments, the smart home controller 520 may perform the functionalities as discussed herein as part of a "cloud" network, or may otherwise communicate with other hardware or software components within the cloud to send, retrieve, and/or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code is adapted to be executed by the processor 562 (e.g., working in connection with the operating system 579) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML). In some embodiments, the computer program product may be part of a cloud network of resources.

VIII. ADDITIONAL EMBODIMENTS

The present embodiments may relate to, inter alia, managing operation of devices or personal property within a home or other type of property, such as household furniture, appliances, electronics, vehicles (e.g., cars, boats, motorcycles), and/or other personal belongings (e.g., clothing, jewelry, antiques). Generally, a home or property may have a "smart" central controller that may be wirelessly connected, or connected via hard-wire, with various household related items, devices, and/or sensors. The central controller may be associated with any type of property, such as homes, office buildings, restaurants, farms, ships, planes, vehicles, and/or other types of properties.

The central controller, and/or one or more remote processors or servers associated with an insurance provider, may be in wireless or wired communication with various "smart" items or devices, such as smart appliances (e.g., clothes washer, dryer, dish washer, refrigerator, etc.); smart heating devices (e.g., furnace, space heater, etc.); smart cooling devices (e.g., air conditioning units, fans, ceiling fans, etc.); smart plumbing fixtures (e.g., toilets, showers, water heaters, piping, interior and yard sprinklers, etc.); smart cooking devices (e.g., stoves, ovens, grills, microwaves, etc.); smart wiring, lighting, and lamps; smart personal vehicles; smart thermostats; smart windows, doors, or garage doors; smart window blinds or shutters; and/or other smart devices and/or sensors capable of wireless or wired communication. Each smart device (or sensor associated therewith), as well as the central controller and/or insurance provider remote processor(s), may be equipped with a processor, memory unit, software applications, wireless transceivers, local power supply, various types of sensors, and/or other components.

The central controller, and/or insurance provider remote processor(s), may collect or retrieve various data from the devices or personal property, analyze the data, and/or identify various actions to facilitate based upon the analysis. In particular, the central controller, and/or insurance provider remote processor(s), may issue commands to the devices or otherwise control operation of the devices. Upon receipt, the appropriate device may execute the command(s) to cause the smart device to perform an action or enter a preferred operation state. The central controller, and/or insurance provider remote processor(s), may also generate notifications of various operation states or completed actions, and communicate the notifications to individuals associated with the property.

Generally, the systems and methods offer numerous benefits to operation of devices within the property, as well as to individuals associated with the property. In particular, the systems and methods may automatically detect potential or actual issues with the property that the individuals may not realize exist, and may automatically facilitate preventative or corrective actions to address the issues. As a result, security associated with the property may improve. Further, the systems and methods improve loss prevention and mitigate actual loss. The systems and methods further apply to independent and/or assisted living situations, whereby patients may receive improved care and individuals associated with the patients may realize more effective communication. Additionally, the systems and methods may improve energy consumption.

The systems and methods may further offer a benefit to insurance providers and customers thereof. Particularly, the present embodiments may facilitate (a) providing and updating insurance policies; (b) the handling or adjusting of home insurance claims; (c) the disbursement of monies related to insurance claims; (d) modifying insurance coverage amounts; (e) updating and improving damage estimate models, and/or (f) other insurance-related activities. The systems and methods may further offer a benefit to customers by offering improved insurance claim processing. Further, the insurance providers may stand out as a cost-effective insurance provider, thereby retaining existing customers and attracting new customers. It should be appreciated that further benefits to the systems and methods are envisioned.

The smart home controller or remote processor may automatically direct or control (i) opening (and/or unlocking) smart windows and/or smart doors, and/or (ii) lighting up an evacuation path (e.g., remotely operating smart lighting or lamps) when a fire event is detected within the insured home by the smart home controller or remote processor to facilitate occupants evacuating the insured home during the fire event. Additionally or alternatively, the smart home controller or remote processor may automatically direct or control (i) lighting up an evacuation path (e.g., remotely operating smart lighting or lamps) and/or (2) deploying evacuation equipment (e.g., rope or ladder deployment)

when a fire event is detected within the insured home by the smart home controller or remote processor to facilitate occupants evacuating the insured home during the fire event.

The insured home may have smart doors that include smart hinges. The smart hinges may be configured to (1) automatically open when a fire event is detected within the insured home by the smart home controller or remote processor, and (2) it is determined by the smart home controller or remote processor that the insured home is occupied to facilitate occupant evacuation. Additionally or alternatively, the smart hinges may be configured to (3) automatically close when a fire event is detected within the insured home by the smart home controller or remote processor, and (4) it is determined by the smart home controller or remote processor that the insured home is unoccupied to facilitate fire suppression.

In some embodiments, data from one of the smart devices may cause certain actions for another of the devices. For instance, if a smoke alarm triggers, then hinges (e.g., smart hinges) on a set of interior doors may cause the set of interior doors to close.

The insured home may have smart doors that include smart door knobs. The smart door knobs may be configured to change color or glow when a fire event is detected to facilitate insured home occupants finding doors within smoke-filled rooms or homes. Additionally or alternatively, the smart door knobs may be configured to change color or glow when a fire event is detected (such as by a heat sensor integrated with the smart door knob) to indicate that there is a fire, or potential fire, on the other side of the smart door.

IX. ADDITIONAL CONSIDERATIONS

As used herein, the term "smart" may refer to devices, sensors or appliances located inside or proximate to a property with the ability to remotely communicate information about the status of the device, sensor, or appliance and/or receive instructions that control the operation of the device, sensor, or appliance. For example, a smart thermostat may be able to remotely communicate the current temperature of the home and receive instructions to adjust the temperature to a new level. As another example, a smart water tank may be able to remotely communicate the level water contained therein and receive instructions to restrict the flow of water leaving the tank. In contrast, "dumb" devices, sensors, or appliances located inside or proximate to a property require manual control. Referring again to the thermostat example, to adjust the temperature on a "dumb" thermostat, a person would have to manually interact with the thermostat. As such, a person may be unable to use a communication network to remotely adjust a "dumb" device, sensor, or appliance.

For simplicity's sake, a "smart device" shall be used herein to refer to any of a smart device, sensor, appliance, and/or other smart equipment that may be disposed on or proximate to a property. In embodiments in which an appliance and a sensor external to the particular appliance are associated with each other, "smart device" may refer to both the external sensors and the appliance collectively. Some examples of devices that may be "smart devices" are, without limitation, valves, piping, clothes washers/dryers, dish washers, refrigerators, sprinkler systems, toilets, showers, sinks, soil monitors, doors, locks, windows, shutters, ovens, grills, fire places, furnaces, lighting, sump pumps, security cameras, and alarm systems. An individual associated with the property shall be referred to as the "homeowner," but it is also envisioned that the individual is a family member of the homeowner, a person renting/subletting the property, a person living or working on the property, a neighbor of the property, an insured, or any other individual that may have an interest in preventing or mitigating damage to the property.

Further, any reference to "home" is meant to be exemplary and not limiting. The systems and methods described herein may be applied to any property, such as offices, farms, lots, parks, and/or other types of properties or buildings. Accordingly, "homeowner" may be used interchangeably with "property owner." As used herein, "property" may also refer to any buildings, belongings and/or equipment disposed on the property itself.

It should be understood that the smart devices may be considered specific-purpose computers designed to perform specific tasks. For example, a smart window may comprise a processor specifically configured to monitor one or more networks for remotely-generated instructions to cause the smart window to open and/or close. The processor may additionally be specifically programmed to interpret the instructions to generate another instruction to cause a motor component corresponding to the smart window to physically open and/or close the smart window. In addition to the execution of instructions, the processor may also be specifically configured to monitor conditions associated with the smart window and to transmit the conditions via one or more networks. To this end, the processor corresponding to a smart device may be configured solely to perform specific actions indicated by received instructions and to communicate specific conditions associated with the smart device. Accordingly, the processor corresponding to the smart device may not be configurable to perform additional and/or alternative general-purpose functions typically associated with general-purpose computers. It should be understood that since the present application contemplates a variety of different smart devices, the specific-purpose of each processor may vary between and among the smart devices.

With the foregoing, an insurance customer may opt-in to a rewards, insurance discount, or other type of program. After the insurance customer provides their affirmative consent, an insurance provider remote server may collect data from the customer's mobile device, smart home controller, or other smart devices—such as with the customer's permission or affirmative consent. The data collected may be related to smart home functionality (e.g., fire mitigation functionality), and/or insured assets before (and/or after) an insurance-related event, including those events discussed elsewhere herein. In return, risk averse insureds, home owners, or home or apartment occupants may receive discounts or insurance cost savings related to home, renters, personal articles, auto, and other types of insurance from the insurance provider.

In one aspect, smart or interconnected home data, and/or other data, including the types of data discussed elsewhere herein, may be collected or received by an insurance provider remote server, such as via direct or indirect wireless communication or data transmission from a smart home controller, mobile device, or other customer computing device, after a customer affirmatively consents or otherwise opts-in to an insurance discount, reward, or other program. The insurance provider may then analyze the data received with the customer's permission to provide benefits to the customer. As a result, risk averse customers may receive insurance discounts or other insurance cost savings based upon data that reflects low risk behavior and/or technology that mitigates or prevents risk to (i) insured assets, such as homes, personal belongings, or vehicles, and/or (ii) home or apartment occupants.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

The terms "insurer," "insuring party," and "insurance provider" are used interchangeably herein to generally refer to a party or entity (e.g., a business or other organizational entity) that provides insurance products, e.g., by offering and issuing insurance policies. Typically, but not necessarily, an insurance provider may be an insurance company.

Although the embodiments discussed herein relate to home or personal property insurance policies, it should be appreciated that an insurance provider may offer or provide one or more different types of insurance policies. Other types of insurance policies may include, for example, condominium owner insurance, renter's insurance, life insurance (e.g., whole-life, universal, variable, term), health insurance, disability insurance, long-term care insurance, annuities, business insurance (e.g., property, liability, commercial auto, workers compensation, professional and specialty liability, inland marine and mobile property, surety and fidelity bonds), automobile insurance, boat insurance, insurance for catastrophic events such as flood, fire, volcano damage and the like, motorcycle insurance, farm and ranch insurance, personal liability insurance, personal umbrella insurance, community organization insurance (e.g., for associations, religious organizations, cooperatives), and other types of insurance products. In embodiments as described herein, the insurance providers process claims related to insurance policies that cover one or more properties (e.g., homes, automobiles, personal property), although processing other insurance policies is also envisioned.

The terms "insured," "insured party," "policyholder," "customer," "claimant," and "potential claimant" are used interchangeably herein to refer to a person, party, or entity (e.g., a business or other organizational entity) that is covered by the insurance policy, e.g., whose insured article or entity (e.g., property, life, health, auto, home, business) is covered by the policy. A "guarantor," as used herein, generally refers to a person, party or entity that is responsible for payment of the insurance premiums. The guarantor may or may not be the same party as the insured, such as in situations when a guarantor has power of attorney for the insured. An "annuitant," as referred to herein, generally refers to a person, party or entity that is entitled to receive benefits from an annuity insurance product offered by the insuring party. The annuitant may or may not be the same party as the guarantor.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

The patent claims at the end of this patent application are not intended to be construed under 35 U.S.C. § 112(f) unless traditional means-plus-function language is expressly recited, such as "means for" or "step for" language being explicitly recited in the claim(s).

This detailed description is to be construed as examples and does not describe every possible embodiment, as describing every possible embodiment would be impractical, if not impossible. One could implement numerous alternate embodiments, using either current technology or technology developed after the filing date of this application.

What is claimed:

1. A computer-implemented method of responding to a fire on a property, the property populated with a hardware controller in communication with a plurality of devices, the plurality of devices including a smart door including a corresponding smart hinge, each of the plurality of devices configured to monitor various conditions associated with the property, the method comprising:
    analyzing, by one or more processors of the hardware controller, a first set of sensor data received from at least one of the plurality of devices to determine a location of the fire on the property;
    accessing, by the one or more processors, a database of smart device information using the location of the fire, wherein, for devices associated with information in the database, the database includes indications of at least one of (i) a location of the device or (ii) a set of functions that the device is capable of performing to mitigate risks associated with the fire;
    based upon the accessed smart device information, generating, by the one or more processors, one or more instructions corresponding to a set of actions to be performed by at least a portion of the plurality of devices, wherein at least one action of the set of actions is for the smart door to cause the smart hinge to rotate in a manner that opens or closes the smart door, and wherein each instruction includes (i) an identity of a particular device that performs a particular action from the set of actions and (ii) an action code associated with the particular action; and
    directing or controlling, by the one or more processors, the at least the portion of the plurality of devices to perform the set of actions by transmitting the one or more instructions to cause the plurality of devices to analyze the identity in the transmitted one or more instructions to determine whether to perform the action associated with the action code.

2. The computer-implemented method of claim 1, wherein directing or controlling the smart door further comprises:
    receiving, at the hardware controller via a first communication network, a second set of sensor data from at least one of the plurality of devices, the second set of sensor data indicative of the presence of the set of individuals on the property;
    analyzing, by the one or more processors, the second set of sensor data to determine a number of individuals within the set of individuals present on the property;

when the set of individuals present on the property includes no individuals, directing or controlling, by the one or more processors, the smart door to close to facilitate fire suppression; and when the set of individuals present on the property includes at least one individual, directing or controlling, by the one or more processors, the smart door to open to facilitate evacuation by the set of individuals.

3. The computer-implemented method of claim 1, wherein directing or controlling the at least the portion of the plurality of devices further comprises:

analyzing, by the one or more processors, the first set of sensor data to determine a location of smoke on the property;

comparing, by the one or more processors, the location of the smoke to a location of the smart door; and when the location of the smoke is proximate to the location of the smart door, directing or controlling, by the one or more processors, the smart door to cause a corresponding smart door knob to glow or change color to increase a visibility of the smart door.

4. The computer-implemented method of claim 1, wherein directing or controlling the at least the portion of the plurality of devices further comprises:

comparing, by the one or more processors, the location of the fire to a location of the smart door; and when the location of the fire is proximate to the location of the smart door, directing or controlling, by the one or more processors, the smart door to cause a corresponding smart door knob on a first side of the smart door to be illuminated in a color indicative of the fire being located proximate to a second side of the smart door.

5. The computer-implemented method of claim 1, further comprising:

receiving, from a heat sensor located in a smart door knob corresponding to the smart door, a portion of the first set of sensor data.

6. The computer-implemented method of claim 1, wherein the at least the portion of the plurality of devices includes smart evacuation equipment, wherein the smart evacuation equipment includes at least one of an escape ladder, a rope, or a set of stairs, and wherein directing or controlling the at least the portion of the plurality of devices further comprises:

directing or controlling, by the one or more processors, a portion of the smart evacuation equipment to deploy, wherein deploying causes the smart evacuation equipment to become usable by individuals on the property.

7. The computer-implemented method of claim 1, further comprising:

transmitting, to an insurance provider associated with the property, a notification, wherein the notification includes an indication of at least one of the set of actions, and wherein transmitting the notification causes the insurance provider to perform an insurance-related action.

8. The computer-implemented method of claim 1, further comprising:

transmitting, to an emergency services provider, an alert, wherein the alert indicates that the fire is present on the property.

9. The computer-implemented method of claim 1, wherein generating the one or more instructions corresponding to the set of actions further comprises:

generating, by the one or more processors, an escape route for an individual located on the premises of the property; and transmitting, to an electronic device associated with the individual, the escape route.

10. A system for responding to a fire on a property, the property populated with a hardware controller in communication with a plurality of devices, each of the plurality of devices configured to monitor various conditions associated with the property, the plurality of devices including a smart door including a corresponding smart hinge, the system comprising:

a plurality of transceivers adapted to communicate data;

a memory adapted to store non-transitory computer executable instructions; and one or more processors adapted to interface with the plurality of transceivers, wherein the one or more processors are configured to execute the non-transitory computer executable instructions to cause the system to:

analyze, by the one or more processors, a first set of sensor data received from at least one of the plurality of devices to determine a location of the fire on the property;

access, by the one or more processors, a database of smart device information using the location of the fire, wherein, for devices associated with information in the database, the database includes indications of at least one of a (i) location of the device or (ii) a set of functions that the device is capable of performing to mitigate risks associated with the fire;

based upon the accessed smart device information, generate, by the one or more processors, one or more instructions corresponding to a set of actions to be performed by at least a portion of the plurality of devices, wherein at least one action of the set of actions is for the smart door to cause the smart hinge to rotate in a manner that opens or closes the smart door and wherein each instruction includes (i) an identity of a particular device that performs a particular action from the set of actions and (ii) an action code associated with the particular action; and direct or control, by the one or more processors, the at least the portion of the plurality of devices to perform the set of actions by transmitting the one or more instructions via the plurality of transceivers to cause the plurality of devices to analyze the identity in the transmitted one or more instructions to determine whether to perform the action associated with the action code.

11. The system of claim 10, wherein to direct or control the smart door, the one or more processors are further configured to execute the non-transitory computer executable instructions to cause the system to:

receive, by the plurality of transceivers, a second set of sensor data from at least one of the plurality of devices, the second set of sensor data indicative of the presence of the set of individuals on the property;

analyze, by the one or more processors, the second set of sensor data to determine a number of individuals within the set of individuals present on the property;

when the number of individuals is zero, direct or control, by the one or more processors, the smart door to close to facilitate fire suppression; and when the number of individuals is at least one, direct or control, by the one or more processors, the smart door to open to facilitate evacuation by the set of individuals.

12. The system of claim 10, wherein to direct or control the at least the portion of the plurality of devices, the one or more processors are further configured to execute the non-transitory computer executable instructions to cause the system to:
 analyze, by the one or more processors, the first set of sensor data to determine a location of smoke on the property;
 compare, by the one or more processors, the location of the smoke to a location of the smart door; and
 when the location of the smoke is proximate to the location of the smart door, direct or control, by the one or more processors, the smart door to cause a corresponding smart door knob to glow or change color to increase a visibility of the smart door.

13. The system of claim 10, wherein to direct or control the at least the portion of the plurality of devices, the one or more processors are further configured to execute the non-transitory computer executable instructions to cause the system to:
 compare, by the one or more processors, the location of the fire to a location of the smart door; and
 when the location of the fire is proximate to the location of the smart door, direct or control, by the one or more processors, the smart door to cause a corresponding smart door knob on a first side of the smart door to be illuminated in a color indicative the fire being located proximate to a second side of the smart door.

14. The system of claim 10, wherein the at least the portion of the plurality of devices includes smart evacuation equipment, wherein the smart evacuation equipment includes at least one of an escape ladder, a rope, or a set of stairs, and wherein to direct or control the at least the portion of the plurality of devices, the one or more processors are further configured to execute the non-transitory computer executable instructions to cause the system to:
 direct or control, by the one or more processors, a portion of the smart evacuation equipment to deploy, wherein deploying causes the smart evacuation equipment to become usable by individuals on the property.

15. The system of claim 10, wherein the one or more processors are further configured to execute the non-transitory computer executable instructions to cause the system to:
 transmit, by the plurality of transceivers, a notification, wherein the notification includes an indication of at least one of the set of actions, and wherein transmitting the notification causes an insurance provider to perform an insurance-related action.

16. The system of claim 10, wherein to generate the one or more instructions corresponding to the set of actions, the one or more processors are further configured to execute the non-transitory computer executable instructions to cause the system to:
 generate, by the one or more processors, an escape route for an individual located on the premises of the property; and
 transmit, by the plurality of transceivers, the escape route to an electronic device associated with the individual.

17. A non-transitory computer-readable storage medium storing processor-executable instructions, that when executed cause one or more processors to:
 analyze, by the one or more processors, a first set of sensor data received from at least one of a plurality of devices to determine a location of the fire on a property;
 access, by the one or more processors, a database of smart device information using the location of the fire, wherein, for devices associated with information in the database, the database includes indications of at least one of (i) a location of the device or (ii) a set of functions that the device is capable of performing to mitigate risks associated with the fire, the smart device database storing information related to a smart door that includes a corresponding smart hinge;
 based upon the access smart device information, generate, by the one or more processors, one or more instructions corresponding to a set of actions to be performed by at least a portion of the plurality of devices, wherein at least one action of the set of actions is for the smart door to cause the smart hinge to rotate in a manner that opens or closes the smart door and wherein each instruction includes (i) an identity of a particular device that performs a particular action from the set of actions and (ii) an action code associated with the particular action; and
 direct or control, by the one or more processors, the at least the portion of the plurality of devices to perform the set of actions by transmitting the one or more instructions to cause the plurality of devices to analyze the identity in the transmitted one or more instructions to determine whether to perform the action associated with the action code.

* * * * *